United States Patent
Seaward et al.

(10) Patent No.: US 10,007,947 B2
(45) Date of Patent: Jun. 26, 2018

(54) THROTTLE-TRIGGERED SUGGESTIONS

(71) Applicant: Accenture Global Services Limited, Dublin (IE)

(72) Inventors: Leona Seaward, Oxfordshire (GB); John Thirlaway, Dublin (IE)

(73) Assignee: Accenture Global Services Limited, Dublin (IE)

( * ) Notice: Subject to any disclaimer, the term of this patent is extended or adjusted under 35 U.S.C. 154(b) by 26 days.

(21) Appl. No.: 14/727,519

(22) Filed: Jun. 1, 2015

(65) Prior Publication Data

US 2016/0307254 A1 Oct. 20, 2016

Related U.S. Application Data

(60) Provisional application No. 62/148,450, filed on Apr. 16, 2015.

(51) Int. Cl.
G06Q 30/00 (2012.01)
G06Q 30/06 (2012.01)

(52) U.S. Cl.
CPC ..... *G06Q 30/0637* (2013.01); *G06Q 30/0631* (2013.01)

(58) Field of Classification Search
CPC .......................................... G06Q 30/00–30/08
See application file for complete search history.

(56) References Cited

U.S. PATENT DOCUMENTS 5,991,739 A 11/1999 Cupps et al.
6,195,691 B1 2/2001 Brown
(Continued)

FOREIGN PATENT DOCUMENTS

EP 2378480 3/2015
WO WO 2000/073955 12/2000
(Continued)

OTHER PUBLICATIONS

'IBM Guidelines' [online]. "Guidelines for estimating CPLEX memory requirements based on problem size," Apr. 9th, 2012 [retrieved on Jun. 8, 2015]. Retrieved from the Internet: URL: http://www-01.ibm.com/support/docview.wss?uid=swg21399933, 3 pages.

(Continued)

*Primary Examiner* — Michael Misiaszek
(74) *Attorney, Agent, or Firm* — Fish & Richardson P.C.

(57) ABSTRACT

Methods, systems, and apparatus, including computer programs encoded on a computer storage medium, for managing orders. The methods include actions of receiving an order for an item to be fulfilled by the fulfillment center for a fulfillment time, obtaining a portion of stored historical preparation information that is relevant to fulfillment of the item by the fulfillment time, obtaining current order information that describes other orders to be fulfilled at the fulfillment center, determining to provide an alternate suggestion, identifying at least one of an alternate item, an alternate fulfillment center, or an alternate time to include in the alternate suggestion, generating the alternate suggestion based on the identification of at least one of the alternate item, the alternate fulfillment center, or the alternate time to include in the alternate suggestion, and providing the alternate suggestion to the user device.

19 Claims, 8 Drawing Sheets

(56) References Cited

U.S. PATENT DOCUMENTS

| | | |
|---|---|---|
| 6,401,085 B1 | 6/2002 | Gershman et al. |
| 6,519,571 B1 | 2/2003 | Guheen et al. |
| 6,526,449 B1 | 2/2003 | Philyaw et al. |
| 6,535,880 B1 | 3/2003 | Musgrove et al. |
| 6,546,374 B1 | 4/2003 | Esposito et al. |
| 6,587,838 B1 | 7/2003 | Esposito et al. |
| 6,697,824 B1 | 2/2004 | Bowman-Amuah |
| 6,801,228 B2 | 10/2004 | Kargman |
| 6,845,361 B1 | 1/2005 | Dowling |
| 6,901,397 B1 | 5/2005 | Moldenhauer et al. |
| 6,903,723 B1 | 6/2005 | Forest |
| 6,920,431 B2 | 7/2005 | Showghi et al. |
| 6,922,567 B1 | 7/2005 | Rydbeck |
| 6,959,283 B1 | 10/2005 | White |
| 6,961,778 B2 | 11/2005 | Swartz et al. |
| 6,980,962 B1 | 12/2005 | Arganbright et al. |
| 7,003,500 B1 | 2/2006 | Driessen |
| 7,069,235 B1 | 6/2006 | Postelnik et al. |
| 7,072,856 B1 | 7/2006 | Nachom |
| 7,110,964 B2 | 9/2006 | Tengler et al. |
| 7,124,098 B2 | 10/2006 | Hopson et al. |
| 7,124,101 B1 | 10/2006 | Mikurak |
| 7,197,478 B2 | 3/2007 | Kargman |
| 7,200,614 B2 | 4/2007 | Reid et al. |
| 7,206,756 B1 | 4/2007 | Walsky |
| 7,233,655 B2 | 6/2007 | Gailey et al. |
| 7,270,267 B2 | 9/2007 | Yeung et al. |
| 7,287,002 B1 | 10/2007 | Asher et al. |
| 7,302,429 B1 | 11/2007 | Wanker et al. |
| 7,340,414 B2 | 3/2008 | Roh et al. |
| 7,412,260 B2 | 8/2008 | Gailey et al. |
| 7,437,295 B2 | 10/2008 | Pitts, III et al. |
| 7,496,526 B2 | 2/2009 | Razumov |
| 7,532,947 B2 | 5/2009 | Waddington et al. |
| 7,590,538 B2 | 9/2009 | St. John |
| 7,603,287 B2 | 10/2009 | Kargman |
| 7,613,636 B2 | 11/2009 | Kargman |
| 7,652,558 B2 | 1/2010 | Lovegreen et al. |
| 7,664,736 B2 | 2/2010 | Jung et al. |
| 7,680,690 B1 * | 3/2010 | Catalano ............... 705/15 |
| 7,694,881 B2 | 4/2010 | Jung et al. |
| 7,698,228 B2 | 4/2010 | Gailey et al. |
| 7,699,219 B2 | 4/2010 | Drummond et al. |
| 7,730,160 B2 | 6/2010 | Moricz |
| 7,774,236 B2 | 8/2010 | Steres et al. |
| 7,776,372 B2 | 8/2010 | Hrudka |
| 7,778,884 B2 | 8/2010 | Bamborough et al. |
| 7,835,946 B2 | 11/2010 | Goren et al. |
| 7,840,591 B2 | 11/2010 | Lutnick |
| 7,860,757 B2 | 12/2010 | Cotton et al. |
| 7,882,150 B2 | 2/2011 | Badyal |
| 7,886,964 B2 | 2/2011 | Steinecker |
| 7,940,914 B2 | 5/2011 | Petrushin |
| 7,945,479 B2 | 5/2011 | Asher et al. |
| 7,970,118 B2 | 6/2011 | O'Dell, III |
| 7,974,873 B2 | 7/2011 | Simmons et al. |
| 8,031,858 B2 | 10/2011 | Miller et al. |
| 8,032,427 B1 | 10/2011 | Spreen et al. |
| 8,065,291 B2 | 11/2011 | Knorr |
| 8,068,599 B2 | 11/2011 | Sarin et al. |
| 8,069,070 B2 | 11/2011 | Papili et al. |
| 8,086,495 B2 | 12/2011 | Ansari et al. |
| 8,123,130 B2 | 2/2012 | Pentel |
| 8,126,777 B2 | 2/2012 | Postelnik et al. |
| 8,150,737 B2 | 4/2012 | Lutnick et al. |
| 8,150,738 B2 | 4/2012 | Lutnick |
| 8,190,483 B2 | 5/2012 | Woycik et al. |
| 8,200,550 B2 | 6/2012 | Aitkins |
| 8,204,757 B2 | 6/2012 | Carlson et al. |
| 8,212,833 B2 | 7/2012 | Kargman |
| 8,271,336 B2 | 9/2012 | Mikurak |
| 8,311,901 B1 | 11/2012 | Carmichael et al. |
| 8,346,624 B2 | 1/2013 | Goad et al. |
| 8,363,814 B2 | 1/2013 | Shaffer et al. |
| 8,417,258 B2 | 4/2013 | Barnes, Jr. |
| 8,433,617 B2 | 4/2013 | Goad et al. |
| 8,436,826 B2 | 5/2013 | Lam |
| 8,438,089 B1 | 5/2013 | Wasserblat et al. |
| 8,452,667 B1 | 5/2013 | Shimoff et al. |
| 8,521,745 B2 | 8/2013 | Probst et al. |
| 8,565,735 B2 | 10/2013 | Wohlwend et al. |
| 8,577,739 B2 | 11/2013 | Ansari et al. |
| 8,600,821 B2 | 12/2013 | Borders et al. |
| 8,626,590 B2 | 1/2014 | Istfan |
| 8,645,274 B2 | 2/2014 | Hasson |
| 8,650,095 B1 | 2/2014 | Shimoff et al. |
| 8,655,743 B1 | 2/2014 | Shimoff et al. |
| 8,660,903 B1 | 2/2014 | Croak et al. |
| 8,738,449 B1 | 5/2014 | Cupps et al. |
| 8,743,073 B2 | 6/2014 | Lam |
| 8,744,913 B2 | 6/2014 | Nasrallah |
| 8,805,729 B2 | 8/2014 | Afram et al. |
| 8,880,420 B2 | 11/2014 | Scotto |
| 8,930,245 B2 | 1/2015 | Streich |
| 8,971,503 B1 | 3/2015 | Kargman |
| 2002/0038261 A1 | 3/2002 | Kargman et al. |
| 2002/0049644 A1 | 4/2002 | Kargman |
| 2002/0067827 A1 | 6/2002 | Kargman |
| 2002/0188492 A1 | 12/2002 | Borton |
| 2004/0111321 A1 | 6/2004 | Kargman |
| 2004/0158494 A1 | 8/2004 | Suthar |
| 2004/0267616 A1 | 12/2004 | Kargman |
| 2005/0015256 A1 | 1/2005 | Kargman |
| 2005/0021407 A1 | 1/2005 | Kargman |
| 2005/0045728 A1 | 3/2005 | Kargman |
| 2005/0049922 A1 | 3/2005 | Kargman |
| 2005/0108097 A1 | 5/2005 | McAleenan |
| 2005/0209914 A1 | 9/2005 | Nguyen et al. |
| 2005/0220009 A1 | 10/2005 | Kargman |
| 2005/0267811 A1 | 12/2005 | Almblad |
| 2006/0010037 A1 | 1/2006 | Angert et al. |
| 2006/0041482 A1 | 2/2006 | Awiszus et al. |
| 2006/0080163 A1 | 4/2006 | Sutcliffe |
| 2006/0080165 A1 | 4/2006 | Sutcliffe |
| 2006/0122896 A1 | 6/2006 | Parsley |
| 2006/0123098 A1 | 6/2006 | Asher et al. |
| 2006/0155753 A1 | 7/2006 | Asher et al. |
| 2006/0155770 A1 | 7/2006 | Asher et al. |
| 2006/0173754 A1 | 8/2006 | Burton et al. |
| 2006/0178943 A1 | 8/2006 | Rollinson et al. |
| 2006/0178951 A1 | 8/2006 | Rund, III |
| 2006/0206390 A1 | 9/2006 | Asano |
| 2006/0218039 A1 | 9/2006 | Johnson |
| 2006/0293965 A1 | 12/2006 | Burton |
| 2007/0061225 A1 | 3/2007 | Havas |
| 2007/0073586 A1 | 3/2007 | Dev et al. |
| 2007/0088624 A1 | 4/2007 | Vaughn et al. |
| 2007/0106565 A1 | 5/2007 | Coelho |
| 2007/0150321 A1 | 6/2007 | Zhao et al. |
| 2007/0150375 A1 | 6/2007 | Yang |
| 2007/0162849 A1 | 7/2007 | Marciano |
| 2007/0208626 A1 | 9/2007 | Awiszus |
| 2007/0276651 A1 | 11/2007 | Bliss et al. |
| 2008/0082420 A1 | 4/2008 | Kargman et al. |
| 2008/0097861 A1 | 4/2008 | Awiszus et al. |
| 2008/0208697 A1 | 8/2008 | Kargman et al. |
| 2008/0222004 A1 * | 9/2008 | Pollock et al. ............... 705/26 |
| 2008/0229430 A1 | 9/2008 | Kargman |
| 2008/0262972 A1 | 10/2008 | Blake |
| 2009/0048890 A1 | 2/2009 | Burgh |
| 2009/0099972 A1 | 4/2009 | Angert et al. |
| 2009/0106124 A1 | 4/2009 | Yang |
| 2009/0119180 A1 | 5/2009 | Moraysky et al. |
| 2009/0150193 A1 | 6/2009 | Hong et al. |
| 2009/0167553 A1 | 7/2009 | Hong et al. |
| 2009/0204492 A1 | 8/2009 | Scifo et al. |
| 2009/0240598 A1 | 9/2009 | Kargman |
| 2009/0261162 A1 | 10/2009 | Kargman et al. |
| 2009/0276347 A1 | 11/2009 | Kargman |
| 2009/0287550 A1 * | 11/2009 | Jennings ............... 705/11 |
| 2009/0307079 A1 | 12/2009 | Martin, Jr. |
| 2009/0307096 A1 | 12/2009 | Antonellis |
| 2010/0023410 A1 | 1/2010 | Doan |
| 2010/0046510 A1 | 2/2010 | Koster et al. |

(56) References Cited

U.S. PATENT DOCUMENTS

| | | |
|---|---|---|
| 2010/0094715 A1 | 4/2010 | Kim et al. |
| 2010/0106607 A1 | 4/2010 | Riddiford et al. |
| 2010/0241707 A1 | 9/2010 | Burton et al. |
| 2010/0274633 A1 | 10/2010 | Scrivano et al. |
| 2011/0011936 A1 | 1/2011 | Morandi et al. |
| 2011/0040654 A1 | 2/2011 | Lutnick et al. |
| 2011/0078637 A1 | 3/2011 | Inderrieden et al. |
| 2011/0082773 A1 | 4/2011 | Potter |
| 2011/0153457 A1 | 6/2011 | Hinks |
| 2011/0173041 A1 | 7/2011 | Breitenbach et al. |
| 2011/0218839 A1 | 9/2011 | Shamaiengar |
| 2011/0258058 A1 | 10/2011 | Carroll et al. |
| 2012/0016745 A1 | 1/2012 | Hendrickson |
| 2012/0022883 A1 | 1/2012 | Morrison |
| 2012/0036017 A1 | 2/2012 | Hasson |
| 2012/0036028 A1 | 2/2012 | Webb |
| 2012/0215657 A1 | 8/2012 | Compton et al. |
| 2012/0296679 A1 | 11/2012 | Im |
| 2013/0007615 A1 | 1/2013 | Goldman |
| 2013/0073477 A1 | 3/2013 | Grinberg |
| 2013/0080269 A1 | 3/2013 | Awiszus |
| 2013/0097054 A1 | 4/2013 | Breitenbach et al. |
| 2013/0124355 A1 | 5/2013 | Wazihullah |
| 2013/0130208 A1 | 5/2013 | Riscalla |
| 2013/0144696 A1 | 6/2013 | Raisch |
| 2013/0144730 A1 | 6/2013 | Harman |
| 2013/0151357 A1 | 6/2013 | Havas et al. |
| 2013/0191243 A1 | 7/2013 | Jung et al. |
| 2013/0204718 A1 | 8/2013 | Freeman |
| 2013/0218692 A1 | 8/2013 | Fischer |
| 2013/0226651 A1 | 8/2013 | Napper |
| 2013/0238451 A1 | 9/2013 | Riscalla |
| 2013/0317921 A1 | 11/2013 | Havas |
| 2013/0325641 A1 | 12/2013 | Brown et al. |
| 2013/0339163 A1 | 12/2013 | Dumontet et al. |
| 2014/0032341 A1 | 1/2014 | Balasubramanian et al. |
| 2014/0046789 A1 | 2/2014 | Baliga |
| 2014/0058901 A1 | 2/2014 | Kim et al. |
| 2014/0114776 A1 | 4/2014 | Solanki et al. |
| 2014/0121811 A1 | 5/2014 | Jung et al. |
| 2014/0156399 A1 | 6/2014 | Jones et al. |
| 2014/0188637 A1 | 7/2014 | Balasubramaniam et al. |
| 2014/0214465 A1 | 7/2014 | L'Heureux et al. |
| 2014/0229301 A1 | 8/2014 | Wu |
| 2014/0249937 A1 | 9/2014 | McNally |
| 2014/0316914 A1 | 10/2014 | Ramini |
| 2014/0330671 A1 | 11/2014 | Mierle et al. |
| 2014/0330672 A1 | 11/2014 | Mierle et al. |
| 2014/0330681 A1 | 11/2014 | Mierle |
| 2014/0343976 A1 | 11/2014 | Ahluwalia et al. |
| 2014/0358778 A1 | 12/2014 | Banerjee et al. |
| 2014/0364164 A1 | 12/2014 | Griffin |
| 2015/0039450 A1 | 2/2015 | Hernblad |
| 2015/0046271 A1 | 2/2015 | Scholl et al. |
| 2015/0088676 A1 | 3/2015 | Elliott et al. |

FOREIGN PATENT DOCUMENTS

| | | |
|---|---|---|
| WO | WO 2001/011523 | 2/2001 |
| WO | WO 2001/073750 | 10/2001 |
| WO | WO 2014/151806 01 | 9/2014 |

OTHER PUBLICATIONS

Clarke and Wright, "Scheduling vehicles from a central depot to a No. Of delivery points," Operations Res., 12:568-581 (1964).

Cook, Chpt 1 "Challenges," In Pursuit of the Travelling Salesman: Mathematics at the Limits of Computation, Princeton University Press, 2011, 20 pages.

Edwards et al., "A Methodology and Implementation for Analytic Modeling in Electronic Commerce Applications," Electronic Commerce Technologies, Lecture notes in computer science, 2040:148-157, 2001.

Fingas, "Square's new restaurant delivery app lets you track your meal," engadget, (Dec. 4, 2014), 6 pages http://www.engadget.com/2014/12/04/caviar-for-iphone/.

Fitchard, "Where's that delivery guy? GrubHub intros meal tracking," (Nov. 13, 2012), 4 pages https://gigaom.com/2012/11/13/wheres-that-delivery-guy-grubhub-intros-meal-tracking/.

Medji, Chpt 5 "Network of Queues," Stochastic Models in Queuing Theory, Elsevier Academic Press, 2002, 35 pages.

Mingozzi et al., "Dynamic programming strategies and reduction techniques for the traveling salesman problem with time windows and precedence constraints," Operations Research, 45:365-377 (1997).

Munkres, "Algorithms for the Assignment and Transportation Problems," J Soc Indust Appl Math., 5(1):32-38 (Mar. 1957).

Rodriguez, "Amazon says it sold 426 items a second on Cyber Monday," LA Times, (Dec. 26, 2013), 2 pages http://articles.latimes.com/2013/dec/26/business/la-fi-tn-amazon-sold-426-items-per-second-cyber-monday-20131226.

\* cited by examiner

THROTTLE-TRIGGERED SUGGESTIONS

CROSS-REFERENCE TO RELATED APPLICATIONS

This application claims the benefit of U.S. Provisional Patent Application No. 62/148,450, filed Apr. 16, 2015, which is hereby incorporated by reference in its entirety.

TECHNICAL FIELD

This disclosure generally relates to a system architecture.

BACKGROUND

System architectures may be used to manage orders. In some instances, system architectures may manage orders placed through the Internet.

SUMMARY

In general, an aspect of the subject matter described in this specification may involve a process for managing orders. The operations include tracking, over time and at a server, performance of a fulfillment center in fulfilling orders for items at the fulfillment center and user responses to alternate suggestions and based on the tracking, storing, in an electronic storage accessible to the server, historical preparation information that describes historical performance of the fulfillment center in fulfilling orders for items at the fulfillment center. Additional actions include based on the tracking, storing, in the electronic storage accessible to the server, historical user information that indicates a likelihood that a user will accept an alternate suggestion and receiving, at the server and from a user device associated with the user, an order for an item to be fulfilled by the fulfillment center for a fulfillment time, where the order indicates the item and the fulfillment center fulfills the order by enabling an employee at the fulfillment center to prepare the item for the user. Further actions include obtaining a portion of the stored historical preparation information for the fulfillment center that describes historical performance of the fulfillment center that is relevant to fulfillment of the item by the fulfillment time and obtaining current order information that describes other orders to be fulfilled at the fulfillment center. Additional actions include determining, to provide an alternate suggestion based at least on a portion of the stored historical preparation information and the current order information, in response to determining to provide the alternate suggestion, identifying at least one of an alternate item, an alternate fulfillment center, or an alternate time to include in the alternate suggestion based on the stored historical user information that indicates a likelihood that the user will accept the alternate suggestion, generating the alternate suggestion based on the identification of at least one of the alternate item, the alternate fulfillment center, or the alternate time to include in the alternate suggestion, and providing the alternate suggestion to the user device.

In another aspect, a method may include one or more of the operations described above. In yet another aspect, a computer-readable storage medium may be operable to cause a processor to perform one or more of the operations described above.

Implementations may include one or more of the following features. For example, determining, to provide an alternate suggestion based at least on a portion of the stored historical preparation information and the current order information includes determining that the order cannot be fulfilled by the fulfillment center for the fulfillment time.

In certain aspects, determining, to provide an alternate suggestion based at least on a portion of the stored historical preparation information and the current order information includes determining that the order can be fulfilled by the fulfillment center for the fulfillment time but another order is likely to be placed for the item for the fulfillment time.

In some aspects, determining, to provide an alternate suggestion based at least on a portion of the stored historical preparation information and the current order information includes determining that the alternate suggestion is likely to result in a better business value for an entity providing the server.

In some implementations, identifying at least one of an alternate item, an alternate fulfillment center, or an alternate time to include in the alternate suggestion based on the stored historical user information that indicates a likelihood that the user will accept the alternate suggestion includes determining that the alternate suggestion can be fulfilled.

In certain aspects, identifying at least one of an alternate item, an alternate fulfillment center, or an alternate time to include in the alternate suggestion based on the stored historical user information that indicates a likelihood that the user will accept the alternate suggestion includes determining that the user is likely to be interested in the alternate item based on the stored historical user information that indicates a likelihood that the user will accept the alternate suggestion and in response to determining that the user is likely to be interested in the alternate item based on the stored historical user information that indicates a likelihood that the user will accept the alternate suggestion, identifying the alternate item.

In some aspects, identifying at least one of an alternate item, an alternate fulfillment center, or an alternate time to include in the alternate suggestion based on the stored historical user information that indicates a likelihood that the user will accept the alternate suggestion includes determining a likely route for the user based at least on the stored historical user information that indicates a likelihood that the user will accept the alternate suggestion, determining that the alternate fulfillment center is accessible along the likely route, and in response to determining that the alternate fulfillment center is accessible along the likely route, identifying the alternate fulfillment center.

In some implementations, identifying at least one of an alternate item, an alternate fulfillment center, or an alternate time to include in the alternate suggestion based on the stored historical user information that indicates a likelihood that the user will accept the alternate suggestion includes determining an earliest time after the fulfillment time that the order can be fulfilled, determining whether the earliest time satisfies a time threshold with the fulfillment time, and in response to determining that the earliest time satisfies the time threshold with the fulfillment time, identifying the earliest time as the alternate time.

In certain aspects, generating the alternate suggestion based on the identification of at least one of the alternate item, the alternate fulfillment center, or the alternate time to include in the alternate suggestion includes determining a discount to include in the alternate suggestion and including the discount in the alternate suggestion.

In some aspects, additional actions include reserving an order for the alternate suggestion for a predetermined time before receiving a response from the user device to the alternate suggestion.

In some implementations, generating the alternate suggestion based on the identification of at least one of the alternate item, the alternate fulfillment center, or the alternate time to include in the alternate suggestion includes generating, for each of multiple candidate alternate suggestions, outcomes scores that each indicate an estimated value of the candidate alternate suggestion and selecting a predetermined number of the candidate alternate suggestions based at least on the outcome scores.

In certain aspects, identifying at least one of an alternate item, an alternate fulfillment center, or an alternate time to include in the alternate suggestion based on the stored historical user information that indicates a likelihood that the user will accept the alternate suggestion is further based at least on historical performance of the alternate fulfillment center, current orders for the alternate fulfillment center, historical performance for the alternate item, current orders for the alternate items, or current orders for the alternate time.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A system may be used to manage orders for items. For example, a system may enable a user to use an application on a mobile device to order coffee from a coffee shop to be ready for pick up when the user arrives at the coffee shop. A server may receive the order from the mobile device and determine whether the coffee shop can fulfill the order. In response to determining that the coffee shop cannot fulfill the order, the server may provide the mobile device an indication that the coffee shop cannot fulfill the order, and may also provide an alternate suggestion to the user. By determining whether the orders may be fulfilled by particular times and providing alternate suggestions, the system may enable users to avoid waiting for orders that would not be able to be fulfilled by particular fulfillment times and enable users to place alternate orders.

Figure 1:
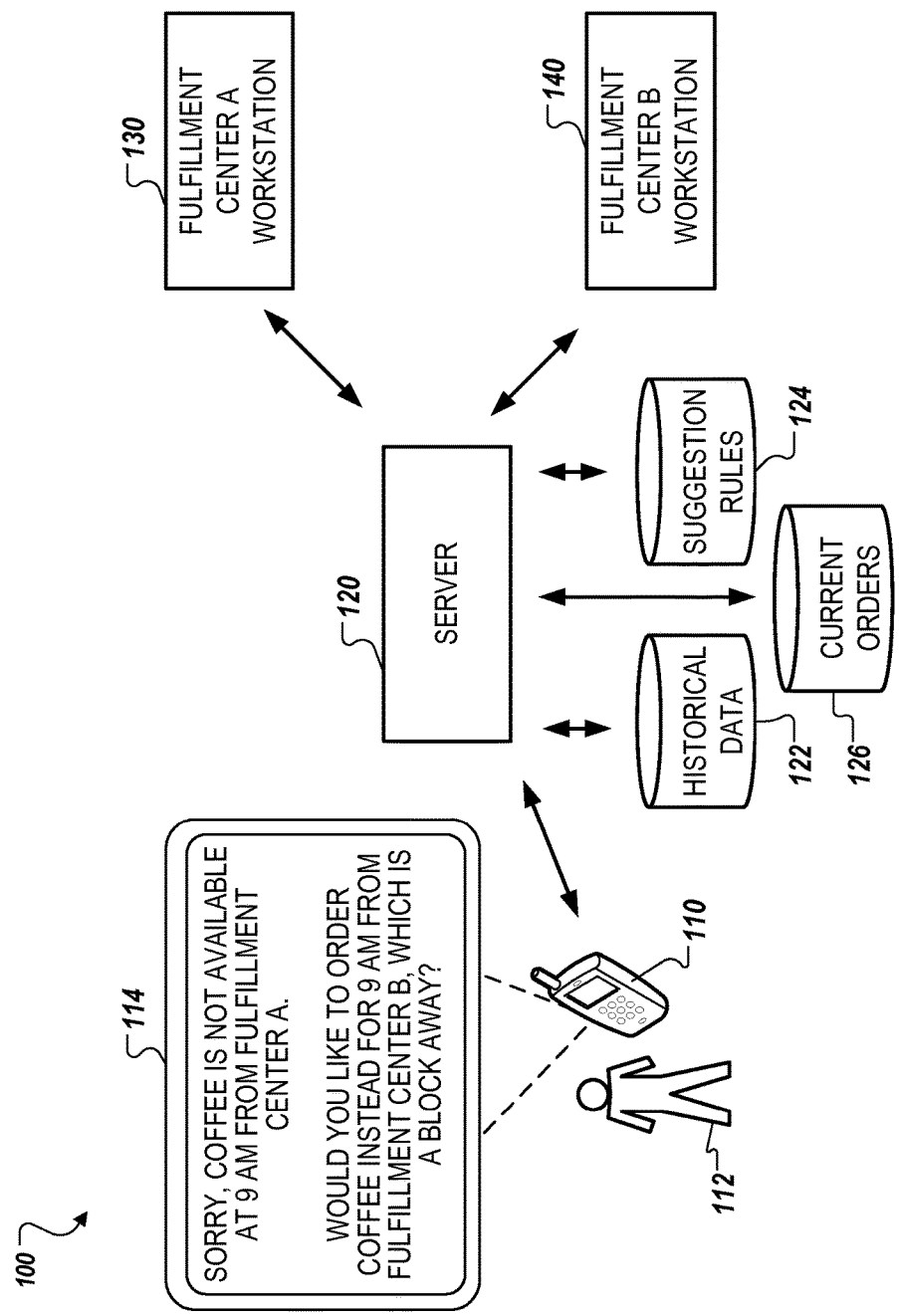
FIG. 1 is a block diagram of an example system for managing orders.

FIG. 1 is a block diagram of an example system 100. Briefly, and as described in further detail below, the system 100 may include a user device 110, a server 120, a historical information database 122, a suggestion rule database 124, a current order database 126, and fulfillment center workstations 130, 140.

The user device 110 may be a computing device used by a user 112. For example, the user device 110 may be a smart phone, a tablet computer, a laptop computer, a desktop computer, or another type of computing device. The user device 110 may include a display that provides an interface for the user 112 to place an order with the system 100 and that provides information to the user 112 regarding the order. For example, the user device 110 may display an interface through which the user 112 may request to provide an order for coffee from fulfillment center A at 9 AM, and in response to which, the user device 110 may display a notification that "Sorry, coffee is not available at 9 AM from fulfillment center A. Would you like to order coffee instead for 9 AM from fulfillment center B a block away?"

The user device 110 may determine to provide an order for a particular item to the server 120. For example, the user device may determine to provide an order for a cup of coffee. The user device 110 may determine to provide an order for a particular item to the server 120 in response to input from the user 112. For example, the user device 110 may display a graphical user interface through which the user 112 may select an item to order, a fulfillment center from which to pick up the order, and a time to pick up the order, and interact with a submission element to indicate to the user device 110 to provide the order to the server 120. In another example, the user device 110 may audibly output prompts for the user 112 to use speech to select an item to order, a fulfillment center from which to pick up the order, and a time to pick up the order, and say "submit order" to indicate to the user device 110 to provide the order to the server 120.

The user device 110 may provide, to the server 120, an order that indicates one or more particular items. For example, an order may indicate that one cup of coffee is ordered. In another example, an order may indicate that two cups of tea and a bagel are ordered. In some implementations, the order may indicate a fulfillment center. For example, the order may indicate fulfillment center A and a current location of the user, and the server 120 may determine a fulfillment time corresponding to when the user 112 is estimated to arrive at fulfillment center A based on the current location of the user.

In some implementations, the order may indicate a fulfillment time. For example, the order may indicate a fulfillment time and a current location of the user, and the server 120 may determine that the user 112 may reach fulfillment center A along the user's expected route by the fulfillment time based on the current location of the user. In some implementations, the order may indicate neither a fulfillment center nor a fulfillment time. For example, the order may indicate that the user 112 would like coffee when the user 112 arrives at the user's office and a current location of the user 112, and the server 120 may determine a fulfillment time based on when the user 112 is estimated to arrive at the office based on the current location of the user 112 and determine a fulfillment center based on a distance of the fulfillment center from the office of the user 112.

In response to providing an order, the user device 110 may receive a response from the server 120 to the order. In some implementations, the user device 110 may receive an indication that the order can be fulfilled and was successfully placed. For example, the user device 110 may receive an indication confirming that the order was placed and in response display, "Order placed." In some implementations, the user device 110 may receive an indication that the order cannot be fulfilled. For example, the user device 110 may receive an indication that the order cannot be fulfilled and in response display, "Sorry, that order cannot be fulfilled."

In some implementations, the user device 110 may receive an alternate suggestion. For example, the user device 110 may receive an indication that the order cannot be fulfilled and receive an alternate suggestion and display, "Sorry, coffee is not available at 9 AM from fulfillment center A. Would you like to order coffee instead for 9 AM from fulfillment center B a block away?" In another example, the user device 110 may receive an indication that the order can be fulfilled and receive an alternate suggestion and display, "Coffee is available at 9 AM from fulfillment center A, but a special offer is also available for coffee at 9:10 AM for a 5% discount. Would you like to order coffee instead for 9:10 AM?"

The user device 110 may receive a response from the user 112 to an alternate suggestion and provide the response to the server 120. For example, the user device 110 may receive user input accepting an alternate suggestion to order coffee from another fulfillment center, and provide a response to the server 120 that the user 112 has selected the alternate suggestion to order coffee from another fulfillment center.

In some implementations, the user device 110 may receive multiple alternate suggestions, provide multiple options to the user 112 corresponding to the multiple alternate suggestions, receive a selection of an alternate suggestion, and provide an indication of the selection of the alternate suggestion to the server 120. For example, the user device 110 may receive an alternate suggestion of an alternate item and another alternate suggestion of an alternate fulfillment center, provide two options corresponding to the two alternate suggestions, receive a user selection of the option for the alternate fulfillment center, and provide an indication to the server 120 that the user 112 accepted the alternate suggestion of the alternate fulfillment center.

The server 120 may be a computing device that manages orders for items. The server 120 may be in communication with the user device 110, the historical information database 122, the suggestion rules database 124, the current order database 126, and the fulfillment center workstations 130, 140 over a network. For example, the server 120 may use the Internet to communicate with the user device 110 and the fulfillment center workstations 130, 140. In another example, the server 120 may use a local network to communicate with the historical information database 122, the suggestion rule database 124, and the current order database 126.

The server 120 may track performance of fulfillment centers in fulfilling orders over time, and store historical preparation information in the historical information database 122 that describes the historical performance. For example, the server 120 may receive performance information from the fulfillment center over a span of a month, where the performance information indicates whenever a cup of coffee is produced, and store historical preparation information that indicates that on average, the particular fulfillment center is able to produce ten cups of coffee every ten minutes. In another example, the server 120 may receive performance information from the fulfillment center for a one week period that indicates whenever a cup of coffee is produced, and store historical preparation information that indicates that in the morning the particular fulfillment center is able to produce twelves cups of tea every ten minutes and in the afternoon the particular fulfillment center is able to produce eight cups of tea every ten minutes. In yet another example, the server 120 may receive performance information from the fulfillment center for a half year period that indicates whenever a cup of coffee is produced and what employees are working during that time, and store historical preparation information that indicates that whenever employee A is producing coffee, employee A is able to produce fifteen cups of coffee every ten minutes, and whenever employee B is producing coffee, employee B is able to produce five cups of coffee every ten minutes.

The server 120 may track user orders and responses to alternate suggestions over time and store, in the historical information database 122, historical user information that indicates a likelihood that a user will accept an alternate suggestion. For example, the server 120 may track the types of items that that the user 112 orders and store information that indicates alternate items that the user 112 may be likely to desire. In another example, the server 120 may track the fulfillment centers at which the user 112 places orders and store information that indicates alternate fulfillment centers that the user 112 may accept for providing an item. In yet another example, the server 120 may track the alternate suggestions that the user 112 accepts and rejects, and store information that indicates the types of alternate suggestions that the user 112 has accepted or rejected, and amounts of discounts at which the user 112 has accepted or rejected alternate suggestions for different types of alternate suggestions.

The server 120 may track current orders and store current order information in the current order database 126. The current order information may indicate current orders that are to be fulfilled by fulfillment centers. The current order information may indicate particular orders, where for each order, the current order information indicates one or more particular items, a quantity for each particular item, a fulfillment center to fulfill the order, and a fulfillment time for fulfilling the order.

The server 120 may receive an order from the user device 110 for an item to be fulfilled by the fulfillment center for a fulfillment time, where the order indicates the item and the fulfillment center fulfills the order by enabling an employee at the fulfillment center to prepare the item for the user 112. As described above, the order the server 120 receives from the user device 110 may indicate one or more of a fulfillment center or a fulfillment time, or the server 120 may determine one or more of a fulfillment center or a fulfillment time based on a current location of the user 112 indicated by the order.

In response to receiving an order from the user device 110, the server 120 may determine whether the fulfillment center can fulfill the order by the fulfillment time. For example, in response to receiving an order for coffee at 9 AM by fulfillment center A, the server 120 may determine that fulfillment center A cannot fulfill the order. In another example, in response to receiving an order for coffee at 9 AM by fulfillment center A, the server 120 may determine that fulfillment center A can fulfill the order.

The server 120 may determine whether the fulfillment center can fulfill the order by the fulfillment time based at least on current order information and a portion of the stored historical preparation information for the fulfillment center. For example, the server 120 may determine that an order for coffee at 9 AM by fulfillment center A can be fulfilled based on current order information that indicates that only nine cups of coffee have been ordered for 9 AM and a portion of stored historical preparation information for fulfilment center A that indicates that fulfillment center A can produce ten cups of coffee at 9 AM. In another example, the server 120 may determine that an order for coffee at 9 AM by fulfillment center A cannot be fulfilled based on current order information that indicates that ten cups of coffee have been ordered for 9 AM and a portion of stored historical preparation information for fulfilment center A that indicates that fulfillment center A can produce ten cups of coffee at 9 AM. In yet another example, the server 120 may determine that an order for coffee at 9 AM for fulfillment center A cannot be fulfilled based on current order information that indicates that seven cups of coffee and two cups of espresso have been ordered for 9 AM and a portion of stored historical preparation information for fulfillment center A that indicates that fulfillment center A can only produce a combined total of nine cups for coffee and espresso at 9 AM.

The server 120 may determine whether the fulfillment center can fulfill the order by the fulfillment time based at least on determining that a demand for the item indicated by the current order information is not less than a production rate estimate for the item. For example, the server 120 may determine that the fulfillment center cannot fulfill the order based on determining that a demand for coffee indicated by the current order information is ten cups, which is not less than a production rate estimate of ten cups for coffee. In another example, the server 120 may determine that the fulfillment center can fulfill the order based on determining that a demand for coffee indicated by the current order information is eight cups, which is less than a production rate estimate of nine cups for coffee.

The server 120 may determine the demand for the item based on determining a quantity of the item ordered from the fulfillment center for a particular time. For example, the server 120 may determine that the current order information indicates that eight cups of coffee have been ordered for 9 AM at fulfillment center A, and in response, determine that the demand for coffee for 9 AM at fulfillment center A is eight cups. In another example, the server 120 may determine that the current order information indicates that ten cups of coffee have been ordered for 9 AM at fulfillment center A, and in response, determine that the demand for coffee for 9 AM at fulfillment center A is ten cups.

The server 120 may determine a production rate estimate for an item based on a portion of the stored historical preparation information for the fulfillment center. For example, the server 120 may determine from the stored historical preparation information for fulfillment center A that fulfillment center A typically produces ten cups of coffee, and in response, determine that the production rate estimate for coffee for fulfillment center A is ten cups per every ten minutes. In another example, the server 120 may determine from the stored historical preparation information for fulfillment center A that fulfillment center A typically produces eight cups of coffee at 9 AM, and in response, determine that the production rate estimate for coffee for fulfillment center A is eight cups at 9 AM. In yet another example, the server 120 may determine from the stored historical preparation information for fulfillment center A that fulfillment center A typically produces fifteen cups of coffee every ten minutes when employee A is working and that employee A is working at 9 AM, and in response, determine that the production rate estimate for coffee when the order is to be fulfilled is fifteen cups every ten minutes.

The server 120 may obtain current order information that describes other orders to be fulfilled at the fulfillment center based on identifying orders for items at the fulfillment time whose fulfillment delays the fulfillment of the order for the item. For example, the server 120 may analyze stored historical preparation information to determine that for each cup of tea that a fulfillment center produces, the fulfillment of a cup of coffee is delayed. The server 120 may store information indicating these associations between items whose fulfillment causes a delay in the other and an amount of the delay the items cause on the other items. Accordingly, in response to receiving an order for a particular item, the server 120 may determine the other types of items that may delay the fulfillment of the particular item based on the stored associations, and obtain current order information that describes orders for the item at the particular time and orders at the particular time for the other item types that may delay the fulfillment of the item.

The server 120 may obtain a portion of the stored historical preparation information, from the historical information database 122 for the fulfillment center, that describes historical performance of the fulfillment center that is relevant to fulfillment of the item by the fulfillment time. For example, for an order for coffee from fulfillment center A at 9 AM, the server 120 may obtain stored historical preparation information from the historical information database 122 for past orders for coffee from fulfillment center A. In another example, for an order for tea from fulfillment center A at 9 AM, the server 120 may obtain stored historical preparation information from the historical information database 122 for past orders for tea at 9 AM from fulfillment center A. In yet another example, for an order for tea from fulfillment center A at 9 AM, the server 120 may determine that employee A is working, and may obtain stored historical preparation information from the historical information database 122 for past orders for tea when employee A is working at fulfillment center A.

In some implementations, the server 120 may determine whether the fulfillment center can fulfill the order by the fulfillment time based at least on a contingency amount. For example, the server 120 may determine that a fulfillment center can produce ten cups of coffee at 9 AM, there are already orders for a total of nine cups of coffee at 9 AM, and there is a contingency amount of one cup of coffee per ten cups of coffee, and in response, determine that the order cannot be fulfilled.

A contingency amount may be a buffer for contingencies in fulfilling orders. For example, contingencies may include mistakes in fulfilling an order. The contingency amount may be preset by an administrator or dynamically determined by the server 120 based on historical preparation information stored in the historical information database 122. For example, the server 120 may determine that the historical preparation information indicates that out of the past week, one out of every ten cups of coffee had a mistake, and in response, determine to set a contingency amount of one cup per every ten cups of coffee.

In some implementations, the server 120 may determine whether the fulfillment center can fulfill the order by the fulfillment time based at least on inventory of the fulfillment center. For example, the server 120 may determine that a fulfillment center's inventory management system indicates that the fulfillment center has eight hundred bagels to sell that day, determine that orders for six hundred bagels have been placed for users, and in response, determine that bagels are still available for sale from the fulfillment center at any desired time that day. In another example, the server 120 may determine that a fulfillment center's inventory management system indicates that the fulfillment center has eight hundred bagels to sell that day, determine that orders for eight hundred bagels have been placed for users, and in response, determine that bagels are not available for sale from the fulfillment center at any desired time that day.

In some implementations, the server 120 may determine whether the fulfillment center can fulfill the order by the fulfillment time based on scheduled shipments to the fulfillment center. For example, the server 120 may determine that fulfillment center A has orders for fulfillment before 10 AM for all remaining apples at fulfillment center A, but that fulfillment center A will have two hundred additional apples arriving at 11 AM, and in response, determine that apples are available for sale after 11 AM.

In some implementations, the server 120 may determine whether the fulfillment center can fulfill the order by the fulfillment time based on an estimated preparation time for handling shipments received by the fulfillment center. For example, the server 120 may determine that fulfillment center A has orders for fulfillment before 10 AM for all remaining apples at fulfillment center A, but that fulfillment center A will have two hundred additional apples arriving at 11 AM and that it will take approximately one hour for the fulfillment center A to handle the shipment and have the apples ready for sale, and in response, determine that apples are available for sale after 12 PM, one hour after when the shipment arrives.

In some implementations, the server 120 may update current order information stored in the current order database 126 based on monitoring estimated time of arrivals of users. For example, the server 120 may determine that an order of coffee is originally scheduled so that the coffee is ready at 9:00 AM for a user, but the location of the user's device indicates that the user 112 is traveling slower than expected and will likely not arrive until 9:10. In the example, in response to the determination, the server 120 may determine that the coffee should instead be picked up at 9:10 AM and that now only nine cups of coffee have been scheduled for pick up at 9:00 AM. The server 120 may schedule the future slot, e.g., 9:10 AM, for the order before releasing the existing slot, e.g., 9:00 AM. This may ensure that the order always has a slot in which to be produced and delivered.

The server 120 may determine a location of users based on information obtained from the user device 110. For example, server 120 may have access to global positioning satellite (GPS) sensor information of the user device 110 and obtain a latitude and longitude of the user device 110. In another example, the server 120 may have access to a location of the user device 110 estimated based on available wireless networks or available wireless towers.

The server 120 may determine an estimated time of arrival of the user based on a location of the user device 110 of the user 112. For example, the server 120 may determine that from the current location of the user device 110, based on historical information for the user 112 stored in the historical information database 122, the user 112 typically takes twenty minutes to get to the user's office. In another example, the server 120 may determine that from the current location of the user device 110, the next subway train to the user's office is delayed so that it arrives in thirty minutes and that based on current calculated transit times, the user 112 likely won't get to work until forty minutes.

The server 120 may calculate an estimated time of arrival of a user given a location based on estimated transit times. The server 120 may estimate transit times based on determining the estimated path the user 112 will take to get to the user's destination, and the estimated time it will take for the user 112 to reach the user's destination using the estimated path. For example, the server 120 may determine that the user 112 is traveling by foot, and from the current location the user 112 is likely to take the path to the destination that results in the least distance traveled by foot, and calculate the estimated time for someone walking at the user's pace to travel the distance for the path. In another example, the server 120 may determine that the user 112 is traveling by foot, and from the current location to the destination the user 112 is likely to take the path that the user 112 typically takes when traveling by foot from the current location to the user's destination, and calculate the estimated time for someone walking at the user's current walking pace to travel the distance for the path. In yet another example, the server 120 may determine that the user 112 typically takes an amount of time to the destination, and therefore use that as the estimated time, rather than a typical time for any person.

In response to determining that the fulfillment center cannot fulfill the order, the server 120 may provide an indication to the user device 110 that the order cannot be fulfilled. For example, in response to determining that the server 120 cannot fulfill an order for coffee at 9 AM from fulfillment center A, the server 120 may provide an indication to the user device 110 that includes "Sorry, coffee is not available at 9 AM from fulfillment center A." In some implementations, the server 120 may include an indication of why the order cannot be fulfilled. For example, the server 120 may include in the indication "Because fulfillment center A has run out of cups" or "Because fulfillment center A cannot produce an additional cup of coffee at 9 AM."

In some implementations, the server 120 may prevent a user from requesting that the user device 110 place an order that cannot be fulfilled. For example, before the server 120 receives an order for coffee at 9 AM from fulfillment center A from the user device 110, the server 120 may determine that an order for coffee at 9 AM from fulfillment center A cannot be fulfilled, and provide an indication that such an order cannot be fulfilled to the user device 110 so that the user device 110 prevents the user 112 from requesting an order for coffee at 9 AM from fulfillment center A. In a more particular example, in response to the server 120 providing an indication that an order cannot be fulfilled, the user device 110 may disable and gray out coffee when a user selects 9 AM and fulfillment center A, may disable and gray out 9 AM when the user 112 selects coffee and fulfillment center A, or may disable and gray out fulfillment center A when the user 112 selects coffee and 9 AM. In another example, the user device 110 may display "Sold Out" or another error message to prevent the user 112 from requesting an order that cannot be fulfilled.

In some implementations, in response to determining that an order cannot be fulfilled, the server 120 may determine to provide an alternate suggestion. For example, in response to receiving an order for coffee at 9 AM from fulfillment center A, the server 120 may provide the notification, "You're estimated to arrive at fulfillment center A at 9:00 AM, but coffee is not available from fulfillment center A until 9:10 AM. Would you like to order coffee for 9:10 AM?" In another example, in response to determining that an order cannot be fulfilled before the user 112 attempts to place an order, e.g., when a user requests to view available items for order at 9 AM from fulfillment center A, the server 120 may provide a notification for the user device 110 to display next to the item, "This item is sold out by fulfillment center A, but is available from fulfillment center B. Would you like to order for pickup at fulfillment center B?" In yet another example, in response to determining that an order cannot be fulfilled, the server 120 may provide a notification to the user device 110 to display "You're estimated to arrive at fulfillment center A at 9:00 AM but coffee is not available until 9:20 AM. Would you like to instead order tea for 9:00 AM?"

In some implementations, the server 120 may determine to provide an alternate suggestion even if an order can be fulfilled. For example, the server 120 may determine that providing an alternate suggestion is likely to result in a better business value for an entity fulfilling the order or managing the server 120. In a particular example, the server 120 may determine that the user 112 may agree to an alternate suggestion for an alternate item with a one-time discount, and that if the user 112 continues to order the alternate item in the future instead of the original item, it will result in a greater profit for the entity. In another particular example, the server 120 may determine that another order for the same item and for the same fulfillment time is likely to be received based on historical order information stored in the historical information database 122, and determine to provide an alternate suggestion based on determining that the particular user is more likely to accept an alternate suggestion than either a typical user or a particular person likely to place the other order.

In response to determining to provide the alternate suggestion, the server 120 may identify at least one of an alternate item, an alternate fulfillment center, or an alternate time to include in the alternate suggestion based on the stored historical user information that indicates a likelihood that the user 112 will accept the alternate suggestion. For example, the server 120 may determine to identify tea as an alternate item to coffee based on the stored historical user information that indicates a high likelihood that the user 112 will accept tea instead of coffee, identify fulfillment center B as an alternate fulfillment center to fulfillment center A based on the stored historical user information that indicates a high likelihood that the user 112 will accept coffee from fulfillment center B instead of fulfillment center A, or identify 9:10 AM as an alternate time to 9:00 AM based on the stored historical user information that indicates a high likelihood that the user 112 will accept the alternate time of 9:10 AM instead of 9:00 AM.

In providing alternate suggestions, the server 120 may obtain one or more suggestion rules from the suggestion rule database 124. For example, the suggestion rules may specify particular ways of identifying alternate items, alternate fulfillment centers, or alternate times, as described below.

In identifying an alternate item, the server 120 may determine that the user 112 is likely to be interested in the alternate item based on the stored historical user information that indicates a likelihood that the user 112 will accept the alternate suggestion, and in response, identify the alternate item. For example, in identifying tea instead of coffee, the server 120 may determine a frequency at which the user 112 ordered tea, a frequency at which the user 112 previously ordered tea from fulfillment center A, or a frequency at which other users, that previously ordered coffee, previously ordered tea.

The server 120 may determine that items more frequently ordered by the user 112, as indicated by the stored historical user information, are more likely to be of interest as an alternate item. In another example, in identifying tea instead of coffee, the server 120 may determine a frequency at which the user 112 previously accepted alternate suggestions for tea instead of coffee or a frequency at which other users previously accepted alternate suggestions for tea instead of coffee. The server 120 may determine that items more frequently accepted as an alternate item, as indicated by the stored historical user information, are more likely to be of interest as an alternate item. In some implementations, the server 120 may determine that the user 112 is likely to be interested in the alternate item based on the stored historical user information particular to a time of day. For example, the server 120 may determine that the specific user has previously purchased an alternative item at a similar time of day, and therefore suggest that item as an alternate item.

Additionally or alternatively, the server 120 may identify an alternate item based on determining another item from the fulfillment center is similar to the item. For example, in response to determining that coffee cannot be provided by fulfillment center A at 9:00 AM, the server 120 may determine that fulfillment center A also offers tea, that tea is similar to coffee, and that tea is available for 9:00 AM, and in response, determine to provide a suggestion of ordering tea instead from fulfillment center A. The server 120 may determine items from a fulfillment center are similar based on data explicitly indicating similarity between items. For example, the server 120 may determine tea is similar to coffee based on data that explicitly indicates that both tea and coffee are hot beverages that include caffeine.

In identifying an alternate fulfillment center, the server 120 may determine that the user 112 is likely to be interested in the alternate fulfillment center based on the stored historical user information that indicates a likelihood that the user 112 will accept the alternate suggestion, and in response, identify the alternate fulfillment center. For example, in identifying fulfillment center B instead of fulfillment center A, the server 120 may determine a frequency at which the user 112 orders from fulfillment center B, a frequency at which the user 112 previously ordered coffee from fulfillment center B, or the frequency at which the user 112 previously accepted alternate suggestions for fulfillment center B instead of fulfillment center A. The server 120 may determine that fulfillment centers more frequently ordered from by the user 112 or more frequently accepted as an alternate fulfillment center, as indicated by the stored historical user information, are more likely to be of interest as an alternate fulfillment center to the user.

In identifying an alternate fulfillment center, the server 120 may determine other fulfillment centers that may fulfill an order for the item. For example, in response to determining that coffee cannot be provided by fulfillment center A when the user 112 is scheduled to arrive at fulfillment center A at 9:00 AM, the server 120 may determine that fulfillment center B is available to provide coffee at 9:00 AM and that fulfillment center B is only a block from fulfillment center A, and in response, determine to identify fulfillment center B as an alternate fulfillment center.

The server 120 may determine other fulfillment centers that may fulfill an order based on determining an item from a fulfillment center is similar to an item from an alternate fulfillment centers. For example, the server 120 may determine that coffee from fulfillment center A is similar to coffee from fulfillment center B. The server 120 may determine another fulfillment center offers an item similar to the item unavailable from the fulfillment center based on data describing the item. For example, the server 120 may determine that both items are titled "Coffee." In another example, the server 120 may access data that explicitly indicates that the item coffee from fulfillment center A and fulfilment center B are similar. In yet another example, the server 120 may determine that fulfillment center A and fulfillment center B are from the same provider, e.g., chain or company, and in response, determine items from fulfillment center A and fulfillment center B with similar names are similar items.

In some implementations, the server 120 may determine the alternate fulfillment center based on determining whether the item can be ordered from an alternative location which is on the way between the user's current location and their final destination. The alternative location may be a different fulfillment center from the same provider, or an alternative provider. The server 120 may take into account the location of access to the alternative location, including altitude of the alternative location in comparison to the user's route.

For example, the server 120 may not identify a fulfillment center above an underground transport route the user 112 is using, but may identify a fulfillment center within a station of the underground transport route at the beginning or final station, including any stages where the user 112 may be swapping modes of transport and therefore travelling within close proximity. In another example, the server 120 may determine a likely route for the user 112 based at least on the stored historical user information that indicates a likelihood that the user 112 will accept the alternate suggestion, determine that the alternate fulfillment center is accessible along the likely route, and in response to determining that the alternate fulfillment center is accessible along the likely route, identifying the alternate fulfillment center.

In identifying an alternate time, the server 120 may determine a time that the order may be fulfilled by the fulfillment center. For example, in response to determining that coffee cannot be provided by fulfillment center A at 9:00 AM, the server 120 may determine that the earliest coffee is available after 9:00 AM is 9:10 AM. The server 120 may determine the time that the order may be fulfilled by the fulfillment center based on determining the next time that the fulfillment center will have the item available to provide. For example, the server 120 may determine that fulfillment center A may provide up to ten cups of coffee at 9:10 AM, that only nine cups of coffee have been ordered for 9:10 AM, and in response, determine that the earliest time that the order may be fulfilled by the fulfillment center is 9:10 AM.

In some implementations, the server 120 may further determine to identify an alternate time based on determining the earliest time that the order may be fulfilled by a fulfillment center satisfies a time threshold, and in response, identifying the earliest time as an alternate time. For example, the server 120 may determine that the earliest time the coffee is available is 9:10 AM, which is less than a thirty minute time threshold than the original fulfillment time of 9:00 AM, and in response, identify 9:10 as an alternate time. In another example, the server 120 may determine that the earliest time the coffee is available is 10:00 AM, which is more than a fifteen minute time threshold after original fulfillment time of 9:00 AM, and in response, determine not to identify 10:00 AM as an alternate time.

In some implementations, the server 120 may include an incentive in association with an alternate suggestion. For example, the server 120 may include a discount of 10% for a suggestion for an alternate item when the original order can be fulfilled. In another example, the server 120 may include a discount of 5% for a suggestion for an alternate fulfillment center that is a block from the original fulfillment center when the original order cannot be fulfilled.

The server 120 may determine the incentive to include with the alternate suggestion based on a likelihood that the user 112 will accept the alternate suggestion with the incentive and a value of the order with the incentive. For example, the server 120 may analyze historical user information stored in the historical information database 122 to determine a likelihood that a particular incentive will cause a user to accept an alternate suggestion and determine whether the increase in the likelihood offsets a cost of the incentive. In a particular example, the server 120 may determine that a 5% discount increases a rate of acceptance of an alternate time less than fifteen minutes by 50% for a particular user, and in response, determine to provide the 5% discount. In another particular example, the server 120 may determine that a 10% discount increases a rate of acceptance of an alternate item by 5% for a particular user, and in response, determine not to provide the 10% discount.

In some implementations, the server 120 may provide multiple alternate suggestions to the user device 110. For example, in response to determining that an order of coffee for 9 AM from fulfilment center A cannot be fulfilled, the server 120 may provide suggestions to the user device 110 of ordering tea instead of coffee, ordering coffee from fulfillment center B, and ordering coffee for 9:10 AM.

The server 120 may determine the multiple alternate suggestions to provide the user device 110 based on selecting a predetermined number of candidate alternate suggestions as the multiple alternate suggestions. For example, the server 120 may generate ten candidate multiple suggestions, and determine to select three of the candidate alternate suggestions as the multiple suggestions.

The server 120 may select the candidate alternate suggestions based on outcome scores of each candidate alternate suggestion that indicate an estimated value of the candidate alternate suggestion. For example, the server 120 may determine that a suggestion for an alternate time that is long after the original time may have a low likelihood of acceptance based on historical information for the user, thus has a low outcome score. In another example, the server 120 may determine that a suggestion for an alternate item has a moderate likelihood of acceptance based on historical information for the user 112 but will result in much greater profits, thus has a high outcome score.

In some implementations, in providing alternate suggestions, the server 120 may place a hold according to the alternate suggestion. A hold may be an order that is either later canceled or confirmed. For example, in response to determining to provide an alternate suggestion for coffee at 9 AM from fulfillment center B, the server 120 may place a hold for coffee at 9 AM for fulfillment center B for a hold time of thirty seconds. If the server 120 receives a response from the user device 110 indicating that the alternate suggestion is accepted, the server 120 may confirm the hold so that the order is fulfilled. If the server 120 receives a response from the user device 110 indicating that the alternate suggestion is not accepted or the hold time elapses before a response is received from the user device 110, the server 120 may cancel the hold.

The fulfillment center workstations 130, 140 may receive orders from the server 120 and provide performance information to the server 120. For example, the fulfillment center workstation 130 may receive an order for coffee at 9 AM from the server 120 and provide information to the server 120 indicating when the order was received, when the order was completed, and who completed the order.

The fulfillment center workstations 130, 140 may be located on the premises of the fulfillment center and used by employees of the fulfillment center. For example, a fulfillment center workstation of a coffee shop may be located in a kitchen of the coffee shop and used by baristas to determine what coffees to make and when to make the coffees. In another example, fulfillment center workstations of a pizza provider may be located in delivery vehicles of the pizza provider and used by pizza deliverers to determine where to deliver each pizza or a delivery route for the pizzas. The delivery route may be dynamically planned based on types of orders and locations to which the orders will be delivered. In yet another example, a fulfillment center workstation may be used by a cashier of a coffee shop to place additional orders for customers within the coffee shop or determine whether a customer is the correct customer to receive coffee that is ordered for pickup at the coffee shop.

The fulfillment center workstations 130, 140 may provide information to employees of the fulfillment center to fulfill orders. For example, a particular fulfillment center workstation of a coffee shop may display an order number, a type of coffee ordered, a customer name for the order, a place of delivery for the order, and a time of delivery for the order.

The fulfillment center workstations 130, 140 may obtain the information to provide employees of the fulfillment center from the orders received from the server 120. For example, the orders received from the server 120 may include data that indicates an order number, a type of coffee ordered, a customer name for the order, a place of delivery for the order, and a time of delivery for the order. In some implementations, the fulfillment center workstations 130, 140 may prioritize the fulfillment of orders. For example, the fulfillment center workstations 130, 140 may prioritize the fulfillment of orders based on when the orders are to be provided to the users.

Different configurations of the system 100 may be used where functionality of the user device 110, the server 120, the historical information database 122, the suggestion rule database 124, the current order database 126, and the fulfillment center workstations 130, 140 may be combined, further separated, distributed, or interchanged. The system 100 may be implemented in a single device or distributed across multiple devices.

Figure 2B:
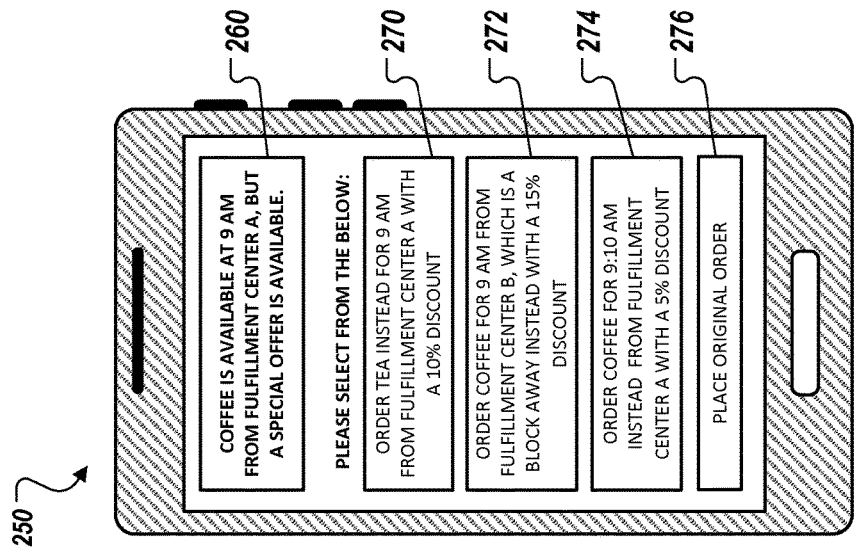
FIGS. 2A and 2B illustrate example interfaces used in managing orders.
Figure 2A:
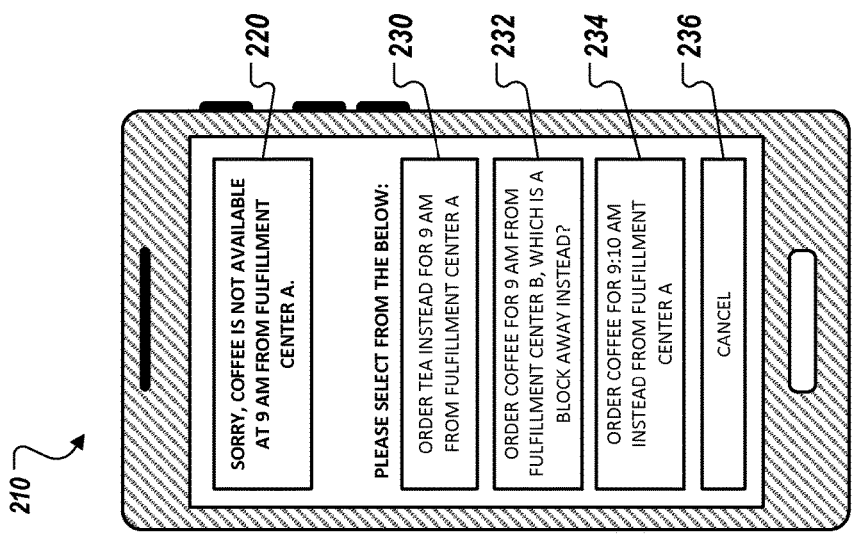

FIG. 2A is an example interface 210 used in managing orders. The interface 210 may be displayed on a user device. The interface 210 includes a notification 220 that an order cannot be fulfilled and multiple alternate suggestions 230, 232, 234, 236. The notification 220 is "Sorry, coffee is not available at 9:00 AM from Fulfillment Center A." The alternate suggestions include "Order tea instead for 9 AM from Fulfillment Center A" 230, "Order coffee for 9 AM from Fulfillment Center B, which is a block away instead" 232, "Order coffee for 9:10 AM instead from Fulfillment Center A" and "Cancel" 236. In some implementations, the interface 210 may indicate whether the suggestion is for an alternate item, an alternate fulfillment center, or an alternate time. For example, the multiple alternate suggestions 230, 232, 234 include the word "instead" immediately following what is alternated. In another example, the interface 210 may color code the multiple alternate suggestions by the type of alternate, e.g., suggestions for alternate items may be outlined in orange and suggestions for alternate times may be outlined in green, or may bold or italicize the portion of the alternate suggestion that is alternate, e.g., tea, fulfillment center B, and 9:10 AM may be bolded.

FIG. 2B is an example interface 250 used in managing orders. The interface 250 may be displayed on a user device. The interface 250 may include a notification 260 that an order can be fulfilled but a special offer is available and multiple alternate suggestions 270, 272, 274, 276. The notification 260 is "Coffee is available at 9:00 AM from Fulfillment Center A, but a special offer is available." The alternate suggestions include "Order tea instead for 9 AM from Fulfillment Center A with a 10% discount" 270, "Order coffee for 9 AM from Fulfillment Center B a block away instead with a 15% discount" 272, "Order coffee for 9:10 AM instead from Fulfillment Center A" with a 5% discount" 274 and "Place original order" 276. In some implementations, the interface 250 may, similarly to interface 210, indicate whether the suggestion is for an alternate item, an alternate fulfillment center, or an alternate time.

Figure 3:
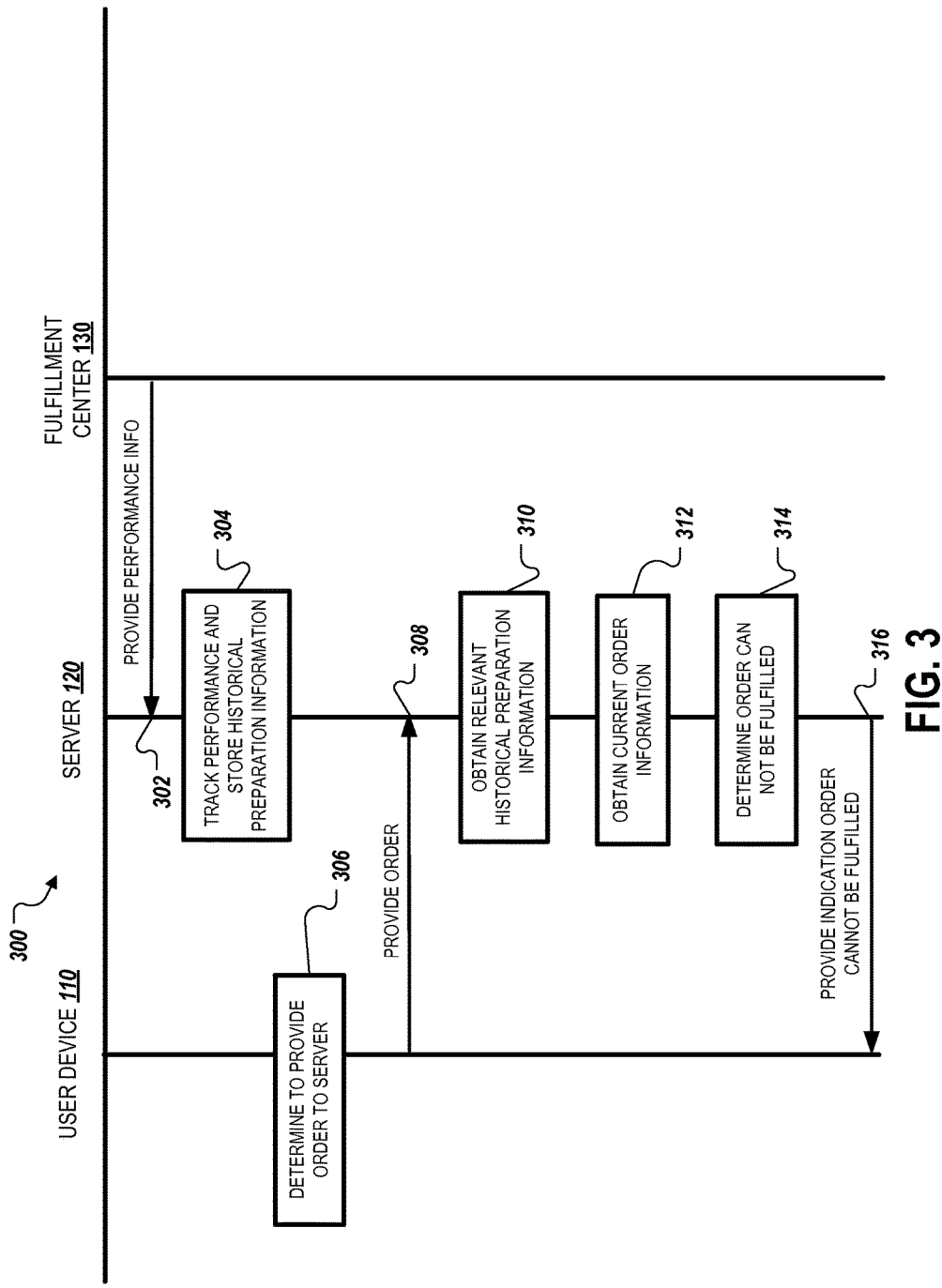
FIGS. 3 and 4 are interaction diagrams of managing orders.

FIG. 3 is an interaction diagram 300 of an example interaction of sharing information. The following describes the interaction as being performed by components of the system 100 that are described with reference to FIG. 1. However, the interaction may be performed by other systems or system configurations.

Initially, the fulfillment center workstation 130 provides performance information to the server (302). For example, multiple fulfillment centers may provide the server 120 information regarding what employees are working, the inventory of items available at the fulfillment centers, the orders placed at the fulfillment centers, and when orders are fulfilled at the fulfillment center.

The server 120 tracks the performance information of the fulfillment centers and stores, in a historical information database, historical preparation information that describes historical performance of the fulfillment center in fulfilling orders for items at the fulfillment center (304). For example, the server 120 may track performance of the fulfillment center over a month and store historical preparation information that describes the dates and times for each pizza that was prepared at the fulfillment center for the month.

The user device 110 later determines to provide an order to the server 120 (306). For example, the user device 110 may receive user input requesting that the user device 110 provide the server 120 an order for a small cheese pizza for pickup at 12 PM at fulfillment center B.

The user device 110 provides an order to the server 120 (308). For example, the user device 110 may provide an order to the server 120 that indicates an item of a small cheese pizza, a fulfillment time of 12 PM, and fulfillment center B to fulfill the order. In another example, the user device 110 may provide an order to the server 120 that indicates an item of a small cheese pizza, a current location of the user, and an indication that the user is traveling to fulfillment center B to pick up the pizza.

The server 120 receives the order and obtains relevant historical preparation information (310). For example, the server 120 may receive an order for a small cheese pizza at 12 PM from fulfillment center B, and in response, obtain a portion of stored historical preparation information from the historical information database 122, where the portion corresponds to historical preparation information for orders at fulfillment center B for small cheese pizzas. In another example, the server 120 may receive an order for a small cheese pizza at 12 PM from fulfillment center B, and in response, obtain a portion of stored historical preparation information from the historical information database 122, where the portion corresponds to historical preparation information for orders at fulfillment center B for small cheese pizzas for the current day of the week at 12 PM.

The server 120 obtains current order information (312). For example, the server 120 may receive an order for a small cheese pizza at 12 PM from fulfillment center B, and then obtain, from the current order database 126, orders for small cheese pizzas that are to be fulfilled by fulfillment center B at 12 PM. In another example, the server 120 may receive an order for a small cheese pizza at 12 PM from fulfillment center B, and then obtain, from the current order database 126, orders for baked items that are to be fulfilled by fulfillment center B at 12 PM.

The server 120 determines orders that cannot be fulfilled (314). For example, the server 120 may determine that an order for a small cheese pizza at 12 PM from fulfillment center B cannot be fulfilled based at least on an obtained portion of the stored historical preparation information that indicates that fulfillment center B can only produce five pizzas at 12 PM and obtained current order information that indicates that five pizzas are already ordered for 12 PM from fulfillment center B.

The server 120 provides an indication that the order cannot be fulfilled to the user device 110 (316). For example, the server 120 may provide the user device an indication of "Sorry, your order for a small cheese pizza at 12 PM from fulfillment center B cannot be fulfilled as fulfillment center B cannot produce any more pizzas for 12 PM."

Figure 4:
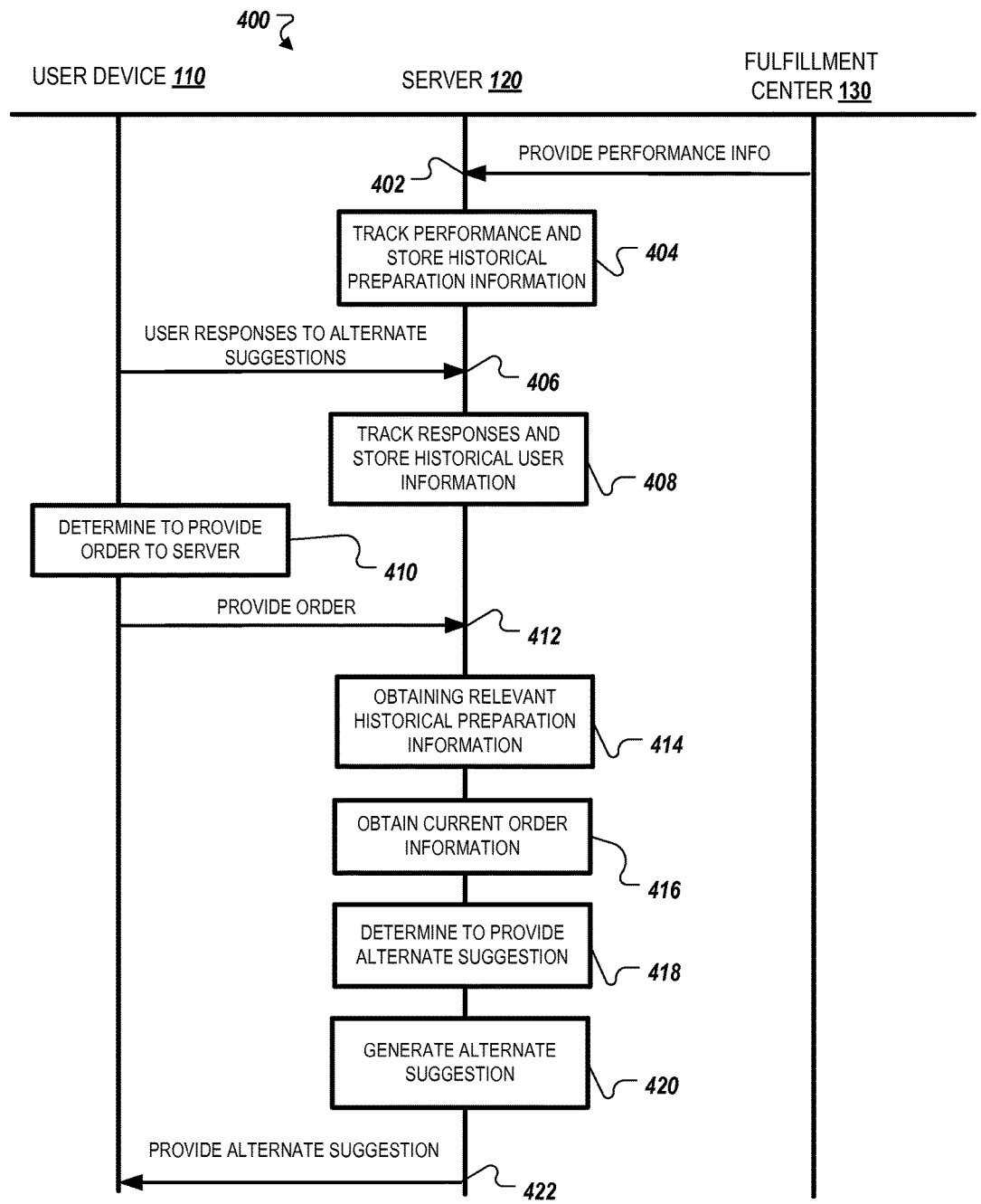

FIG. 4 is an interaction diagram 400 of an example interaction of sharing information. The following describes the interaction as being performed by components of the system 100 that are described with reference to FIG. 1. However, the interaction may be performed by other systems or system configurations.

Initially, the fulfillment center workstation 130 may provide performance information to the server (402). For example, multiple fulfillment centers may provide the server 120 information regarding what employees are working, the inventory of items available at the fulfillment centers, the orders placed at the fulfillment centers, and when orders are fulfilled at the fulfillment center.

The server 120 tracks the performance information of the fulfillment centers and stores, in a historical information database, historical preparation information that describes historical performance of the fulfillment center in fulfilling orders for items at the fulfillment center (404). For example, the server 120 may track performance of the fulfillment center over a month and store historical preparation information that describes the dates and times that each cup of coffee was prepared at the fulfillment center for the month.

The server 120 receives user responses to alternate suggestions (406). For example, the server 120 may receive responses from the user indicating when a user accepted alternate suggestions of tea instead of coffee and when a user rejected alternate suggestions of tea instead of coffee.

The user device 110 later determines to provide an order to the server 120 (406). For example, the user device 110 may receive user input requesting that the user device 110 provide the server 120 an order for a cup of coffee for pickup at 9 AM at fulfillment center A.

The user device 110 provides an order to the server 120 (412). For example, the user device 110 may provide an order to the server 120 that indicates an item of a cup of coffee, a fulfillment time of 9 AM, and fulfillment center A to fulfill the order. In another example, the user device 110 may provide an order to the server 120 that indicates an item of a cup of coffee, a current location of the user, fulfillment center A, and an indication that the user is traveling to fulfillment center A to pick up the cup of coffee.

The server 120 receives the order and obtains relevant historical preparation information (414). For example, the server 120 may receive an order for a cup of coffee at 9 AM from fulfillment center A, and in response, obtain a portion of stored historical preparation information from the historical information database 122, where the portion corresponds to historical preparation information for orders at fulfillment center A for coffee. In another example, the server 120 may receive an order for a cup of coffee at 9 AM from fulfillment center A, and in response, obtain a portion of stored historical preparation information from the historical information database 122, where the portion corresponds to historical preparation information for orders at fulfillment center A for cups of coffee for the current day of the week at 9 AM.

The server 120 obtains current order information (416). For example, the server 120 may receive an order for a cup of coffee at 9 AM from fulfillment center A, and then obtain, from the current order database 126, orders for cups of coffee that are to be fulfilled by fulfillment center A at 9 AM. In another example, the server 120 may receive an order for a cup of coffee at 9 AM from fulfillment center A, and then obtain, from the current order database 126, orders for hot beverages that are to be fulfilled by fulfillment center A at 9 AM.

The server 120 determines to provide an alternate suggestion (418). For example, the server 120 may determine that the order cannot be fulfilled and in response, identifies an alternate item, alternate fulfillment center, or alternate time. In another example, the server 120 may determine that the order can be fulfilled but that an alternate suggestion may result in a more valuable outcome.

The server 120 generates the alternate suggestion (420). For example, the server 120 may generate the alternate suggestion, "Order tea instead for 9 AM from fulfillment center A." In another example, the server 120 may generate the alternate suggestion, "Order coffee instead for 9 AM from fulfillment center B a block away with a 15% discount."

The server 120 provides the alternate suggestion to the user device 110 (422). For example, the server 120 may provide the alternate suggestion "Order tea instead for 9 AM from fulfillment center A" to the user device 110.

Figure 5:
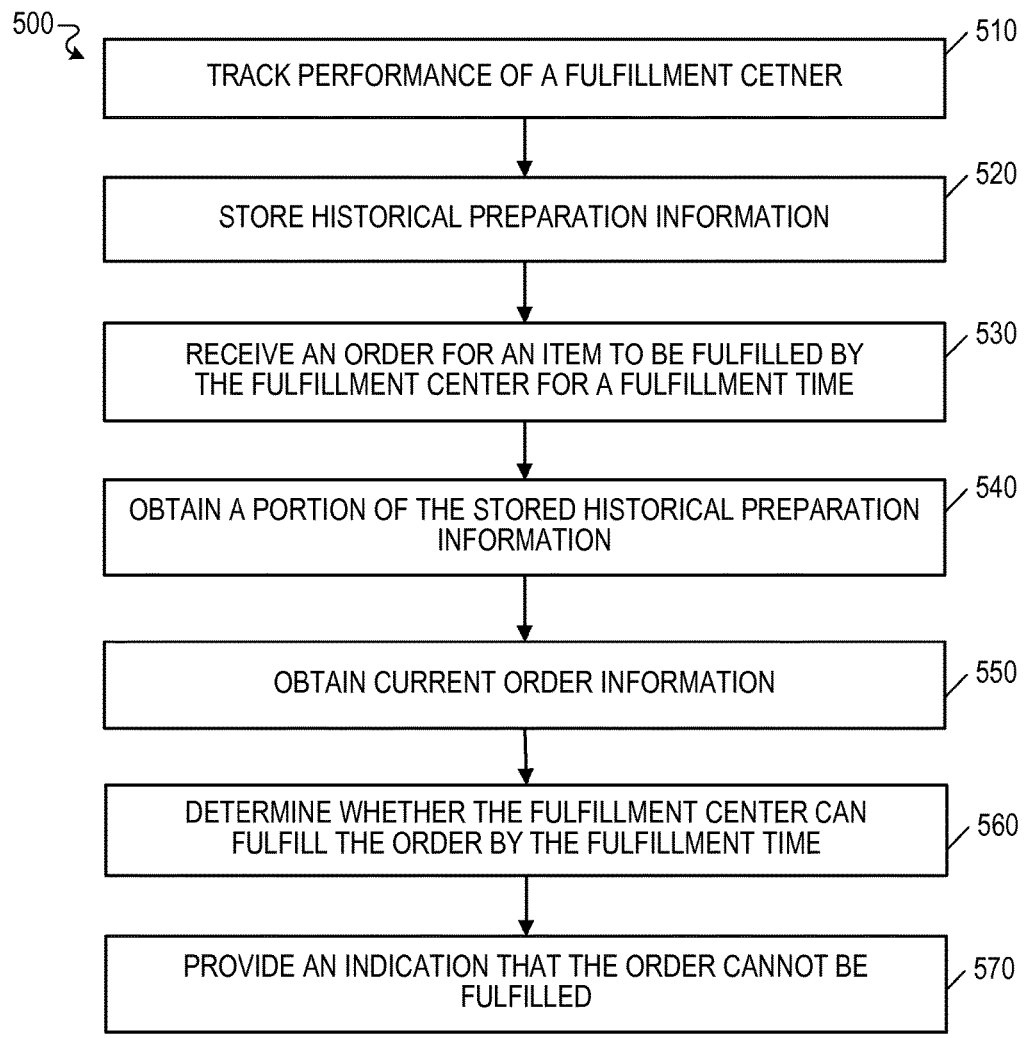
FIGS. 5 and 6 are flowcharts of example processes for managing orders.

FIG. 5 is a flowchart of an example process 500 for managing orders. The following describes the process 500 as being performed by components of the system 100 that are described with reference to FIG. 1. However, the process 500 may be performed by other systems or system configurations.

The server 120 tracks performance of a fulfillment center (510). For example, the server 120 may track the time it takes for fulfillment center B to fulfill different orders.

The server 120 stores historical preparation information (520). For example, the server 120 stores historical preparation information that describes when each order was received, what each order was for, and how long fulfillment center B took to complete each order.

The server 120 receives an order for an item to be fulfilled by the fulfillment center for a fulfillment time (530). For example, the server 120 receives from user device 110 an order for coffee to be fulfilled by fulfillment center B for 9 AM. In another example, the server 120 receives from the user device 110 an order that indicates coffee, a current location of the user, and a destination of the user, and the server 120 determines fulfilment centers accessible along the route of the user and the times that the user will pass by the fulfillment centers.

The server 120 may obtain a portion of the stored historical preparation information (540). For example, the server 120 may obtain an order for coffee to be fulfilled by fulfillment center B for 9 AM, and in response, obtain a portion of stored historical preparation information for coffee previously fulfilled by fulfillment center B for 9 AM. In another example, the server 120 may obtain an order for coffee, determine fulfillment centers accessible to a user along a user's route and times that the user will be near each fulfillment center, and in response, obtain a portion of stored historical preparation information for coffee previously prepared by the fulfillment centers at the times that the user will be near the fulfillment centers.

The server 120 may obtain current order information (550). For example, the server 120 may obtain a list of orders to be fulfilled by fulfillment center B. In another example, the server 120 may obtain a list of orders for fulfillment centers that the user will be near where the orders are for times that the user will be near the corresponding fulfillment centers.

The server 120 may determine whether a fulfillment center can fulfill the order by the fulfillment time (560). For example, the server 120 may determine that fulfillment center B cannot fulfill the order for coffee at 9 AM based at least on the portion of stored historical preparation information indicating nine cups of coffee can be provided by fulfillment center B at 9 AM and current order information indicating that nine cups of coffee have already been ordered from fulfillment center B at 9 AM. In another example, the server 120 may determine that an order for coffee at 9 AM cannot be fulfilled based at least on the portion of stored historical preparation information indicating a number of cups of coffee that can be produced by different fulfillment centers along a user's route, and current order information indicating a number of cups of coffee ordered from the fulfillment centers.

Figure 6:
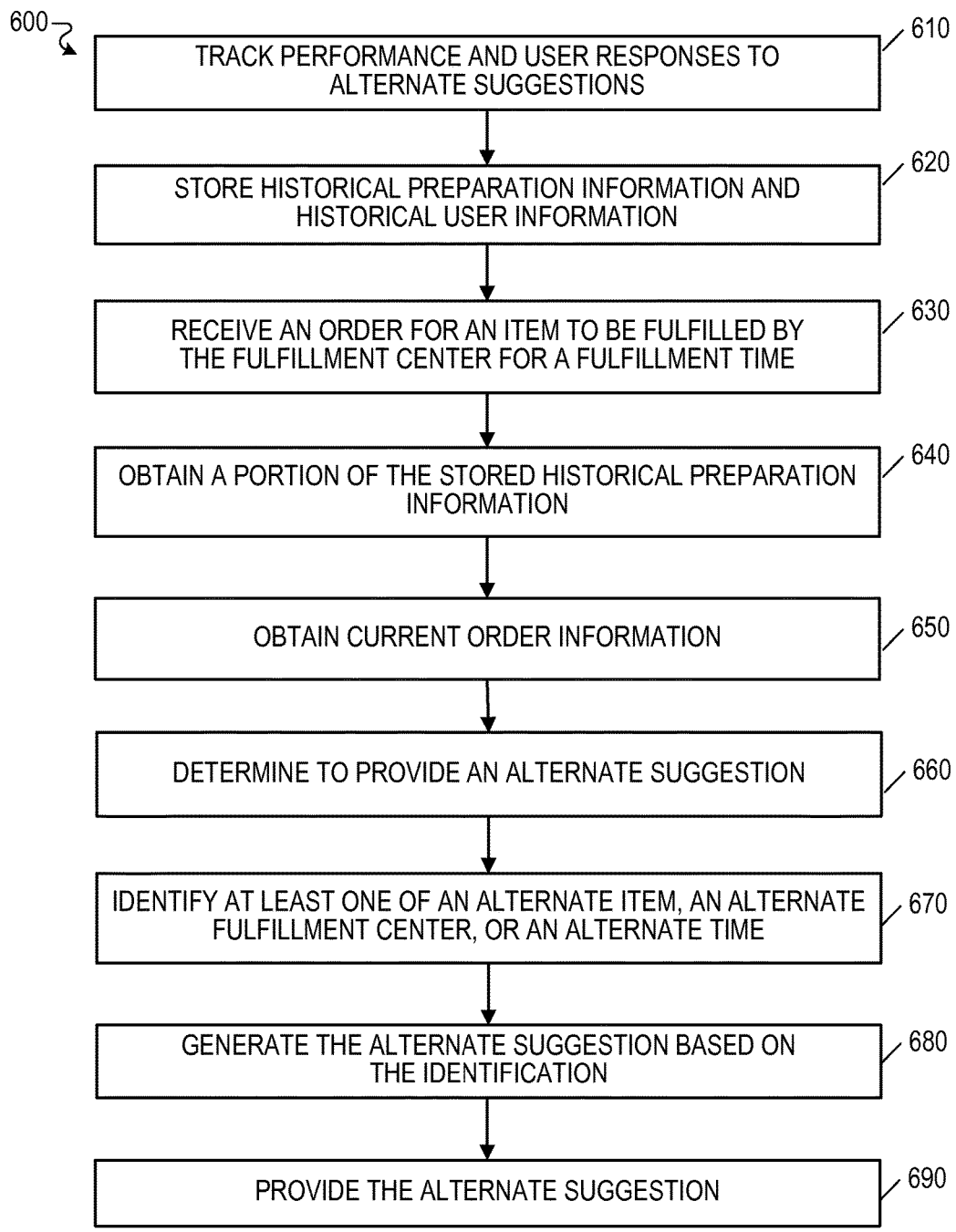

FIG. 6 is a flowchart of an example process 600 for managing orders. The following describes the process 600 as being performed by components of the system 100 that are described with reference to FIG. 1. However, the process 600 may be performed by other systems or system configurations.

The server 120 tracks performance of a fulfillment center and user responses to alternate suggestions (610). For example, the server 120 may track that it takes fulfillment center B ten minutes to prepare grilled cheese sandwich, and the user has accepted an alternate suggestion of a cheeseburger instead of a grilled cheese sandwich, and has rejected alternate suggestions of jam and toast instead of a grilled cheese sandwich.

The server 120 stores historical preparation information and historical user information (620). For example, the server 120 stores historical preparation information that describes that on average fulfillment center B takes ten minutes to prepare a grilled cheese sandwich, and stores historical user information that indicates that the user has accepted a cheeseburger as an alternate item to a grilled cheese sandwich and has rejected alternate suggestions of jam and toast instead of a grilled cheese sandwich.

The server 120 receives an order for an item to be fulfilled by the fulfillment center for a fulfillment time (630). For example, the server 120 receives from user device 110 an order for a grilled cheese sandwich to be fulfilled by fulfillment center B for 11 AM.

The server 120 obtains a portion of the stored historical preparation information (640). For example, the server 120 may obtain an order for a grilled cheese sandwich to be fulfilled by fulfillment center B for 11 AM, and in response, obtain a portion of stored historical preparation information that indicates that the fulfillment center B takes about ten minutes to prepare a grilled cheese sandwich.

The server 120 obtains current order information (650). For example, the server 120 may obtain a list of orders to be fulfilled by fulfillment center B. In another example, the server 120 may obtain a list of orders for grilled cheese sandwiches to be fulfilled by fulfillment center B. In yet another example, the server 120 may obtain a list of orders for grilled cheese sandwiches to be fulfilled by fulfillment center B at 11 AM.

The server 120 determines to provide an alternate suggestion (660). For example, the server 120 may determine that the order for a grilled cheese sandwich to be fulfilled by fulfillment center B for 11 AM can not be fulfilled. In another example, the server 120 may determine that the order for a grilled cheese sandwich to be fulfilled by fulfillment center B for 11 AM can be fulfilled, but the user is likely to accept an alternate suggestion of a later fulfillment time of 11:30 AM, that otherwise another user would not be able to order a grilled cheese sandwich for 11 AM, that another user is likely to order a grilled cheese sandwich for 11 AM, and that the other user is not likely to accept an alternate suggestion.

The server 120 identifies at least one of an alternate item, an alternate fulfillment center, or an alternate time (670). For example, the server 120 may determine from stored historical user information to identify a cheeseburger as an alternate item to a grilled cheese sandwich based on determining that the user has previously ordered a cheeseburger. In another example, the server 120 may determine from stored historical user information to identify a cheeseburger as an alternate item to a grilled cheese sandwich based on determining that the user has previously accepted an alternate suggestion of a cheeseburger instead of a grilled cheese sandwich. In yet another example, the server 120 may determine from stored historical user information to identify a cheeseburger as an alternate item to a grilled cheese sandwich based on determining that the user has not previously rejected an alternate suggestion of a cheeseburger instead of a grilled cheese sandwich.

The server 120 generates an alternate suggestion based on the identification (680). For example, in response to identifying a cheeseburger as an alternate item to a grilled cheese sandwich, the server 120 may generate an alternate suggestion of "Sorry a grilled cheese sandwich is not available from fulfillment center B for 11 AM. Would you like to instead order a cheeseburger?"

The server 120 provides the alternate suggestion to the user device (690). For example, server 120 provides the alternate suggestion "Sorry a grilled cheese sandwich is not available from fulfillment center B for 11 AM. Would you like to instead order a cheeseburger?" to the user device 110.

Figure 7:
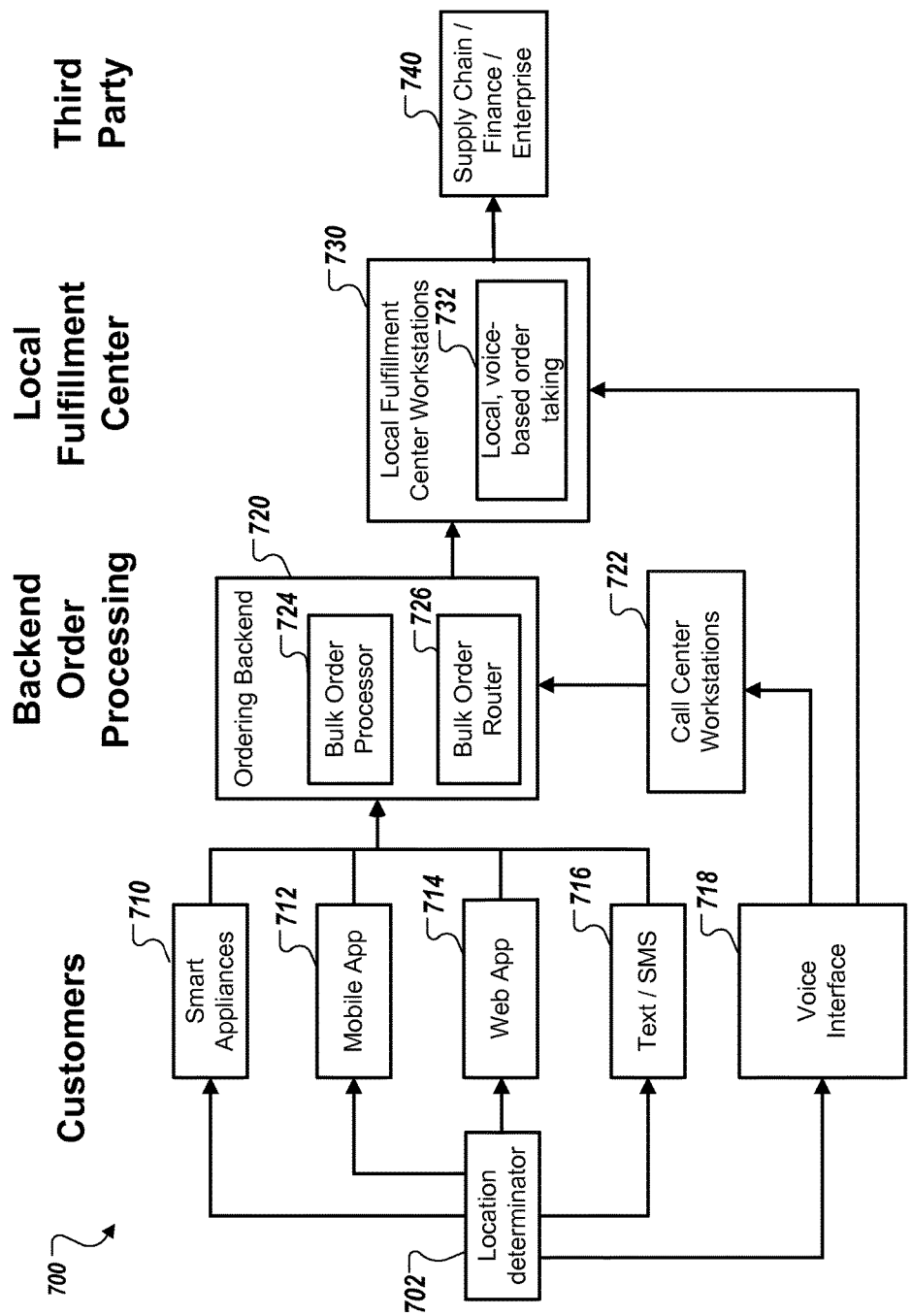
FIG. 7 is a block diagram of an example system for real time delivery.

FIG. 7 is a block diagram of an example system 700. Briefly, and as described in further detail below, the system 700 may include a location determinator 702, smart appliances 710, a mobile application 712, a web application 714, a text or short message service (SMS) application 716, a voice interface 718, an ordering backend 720, call center workstations 722, local fulfillment center workstations 730, and a supply chain, finance, or enterprise component 740. The system 700 may provide for real time delivery of an item. Real time delivery may include point-to-point delivery of small, tangible, purchased goods within a very short period of time of purchase, e.g., few minutes to a few hours. Purchased goods may include typical packaged goods that do not otherwise require real-time delivery, e.g., consumer electronics or office supplies, goods that degrade over a long period of time, e.g., groceries or flowers, or goods that degrade within a very short period of time, e.g., dry ice, ice cream, hot pizza or a cup of coffee.

The location determinator 702 may determine location information for a customer. For example, the location determinator 702 may determine a customer's location based on or more of a service set identifier (SSID) of a nearby detected wireless network, a detected phone mast signal, determined global positioning system (GPS) information, an assigned Internet Protocol (IP) address, a landline location, or a wireless media access control (MAC) address. The location determinator 702 may provide the location information to the smart appliances 710, the mobile application 712, the web application 714, the text or short message service (SMS) application 716, and the voice interface 718.

In some implementations, the location determinator 702 may be included in the user device 110 of FIG. 1.

The smart appliances 710, the mobile application 712, the web application 714, the text or short message service (SMS) application 716, and the voice interface 718 may enable a customer to place an order. For example, one or more of the smart appliances 710, the mobile application 712, the web application 714, the text or short message service (SMS) application 716, and the voice interface 718 may enable a customer to place an order for a cheese pizza to be delivered to the customer's home address at 6:00 PM. To enable customers to place orders, the smart appliances 710, the mobile application 712, the web application 714, the text or short message service (SMS) application 716, and the voice interface 718 may provide interfaces through which the customer may specify a particular item to order, and a particular location for which the customer would like to obtain the item. For example, the smart appliances 710, the mobile application 712, the web application 714, the text or short message service (SMS) application 716, and the voice interface 718 may visually or audibly provide prompts to the customer requesting that the customer specify a particular item to order, a particular location to receive the item, and a particular time to receive the item.

More specifically, the smart appliances 710 may be appliances that may be used to place orders. For example, the smart appliances 710 may include a television that may be used by a customer to place an order for a pizza. The smart appliances 710 may provide an interface for a customer to place an order. For example, the smart appliance 710 may include a display that may render an interface for the customer to order a pizza. The smart appliances 710 may provide orders to an ordering backend 720. For example, the smart appliances 710 may provide an order for a pizza through a network to the ordering backend 720.

The mobile application 712 may be an application running on a mobile device that enables a customer to place an order. For example, an application running on a customer's smart phone may enable the customer to place an order for pizza. A mobile device may include a smart phone, a tablet computer, or some other type of computing device that may be portably used. The mobile application 712 may provide an interface for a customer to place an order. For example, the mobile application 712 may display on the mobile device an interface for the customer to order a pizza. The mobile application 712 may provide orders to an ordering backend 720. For example, the mobile application 712 may provide an order for a pizza through a network to the ordering backend 720. In some implementations, the mobile application 712 may be an application installed on the user device 110 of FIG. 1.

The web application 714 may be an application accessible through a web browser running on a computing device, where the application enables a customer to place an order. For example, a Java application may be rendered by a web browser on a desktop computer and enable a customer to place an order for pizza. A computing device may include a mobile device, a desktop computer, a laptop computer, or some other type of device that computes. The web application 714 may provide an interface for a customer to place an order. For example, the web application 714 may display an interface, in a web browser on a desktop computer, for the customer to order a pizza. The web application 714 may provide orders to an ordering backend 720. For example, the web application 714 may provide an order for a pizza through a network to the ordering backend 720. In some implementations, the web application 714 may be accessed by a web browser on the user device 110 of FIG. 1.

The text or SMS application 716 may be an application running on a mobile device that enables a customer to place an order by text or SMS. For example, an application running on a customer's smart phone may enable the customer to send a text or SMS message to the ordering backend 720 to place an order for pizza. In some implementations, the application may provide a graphical user interface for the user to select a particular item, particular location, and a particular time to receive the item, and generate a SMS message indicating the selections and provide the SMS message to the ordering backend 720. In some implementations, the test or SMS application 716 may be running on the user device 110 of FIG. 1.

The voice interface 718 may be an interface that enables a customer to place an order by voice. For example, the voice interface 718 may be a telephone that a customer may use to verbally order a pizza. The voice interface 718 may communicate with the call center workstations 722. For example, the voice interface 718 may transmit audio captured by the voice interface 718 to the call center workstations 722, and similarly, output audio from the call center workstations 722. The voice interface 718 may additionally or alternatively communicate with a local voice-based order taking component 132 of a local fulfillment center workstation 730. For example, the voice interface 718 may transmit audio captured by the voice interface 718 to the local voice-based order taking component 132, and similarly, output received audio from the local voice-based order taking component 132. In some implementations, the voice interface 718 may be included in the user device 110 of FIG. 1.

The call center workstations 722 may receive voice input from the voice interface 718, generate orders based on the voice input, and provide the orders to the ordering backend 720. For example, the call center workstations 722 may audibly output voice input from the interface 718 to allow customer service representatives to verbally interact with customers, and generate orders for the customers. In some implementations, the call center workstations 722 may be automated and use speech recognition to generate orders for users. For example, the call center workstations 722 may execute an Artificial Intelligence customer service agent program that may verbally speak to the customer to take the order and place the order directly for the customer.

The ordering backend 720 may be a component that processes orders from customers. For example, the ordering backend may receive orders from the smart appliances 710, mobile application 712, web application 714, text or SMS application 716, the voice interface 718, or the call center workstations 722. The ordering backend 720 may process orders based on determining, for each order, one or more local fulfillment center workstations 730 to receive the order. For example, the ordering backend 720 may determine that a first order for a pizza should be provided to a first local fulfillment center workstation and a second order for a pizza should be provided to a different, second local fulfillment center workstation. In some implementations, the ordering backend 720 may be the server 120 of FIG. 1.

The ordering backend 720 may determine a local fulfillment center workstation to receive a particular order based on a location which the customer would like to obtain the item ordered. For example, the ordering backend 720 may determine that a first order indicates the order is to be obtained at a location where the distance from the location to the local fulfillment center is within a distance threshold, and in response, determine to provide the first order to a workstation of the local fulfillment center. In another example, the ordering backend 720 may determine that a second order is to be obtained at a location where the distance from the location to the local fulfillment center exceeds a distance threshold, and in response, determine the second order should be provided to a workstation of another local fulfillment center.

Additionally or alternatively, the ordering backend 720 may determine a local fulfillment center workstation to receive a particular order based on availability of the local fulfillment center to fulfill the order. For example, the ordering backend 720 may determine that a first order for a pizza can be fulfilled by a local fulfillment center as the local fulfillment center may still have capacity to provide the pizza. In another example, the ordering backend 720 may determine that a second order for a pizza cannot be fulfilled by a local fulfillment center as the local fulfillment center may not have capacity to provide the pizza.

In response to determining the local fulfillment center workstations 730 to receive an order, the ordering backend 720 may provide the order to the local fulfillment center workstations 730. For example, in response to determining that a local fulfillment center does deliver to the particular location requested by a customer and has capacity to fulfill an order for pizza, the ordering backend 720 may determine to provide the order for pizza to the local fulfillment center workstations 730 of the local fulfillment center.

In processing the orders, the ordering backend may also process payments for the orders. For example, the ordering backend 720 may validate whether payment information provided in the order is correct. In another example, the ordering backend 720 may place charges for orders using payment information provided in the order.

The ordering backend 720 may include a bulk order processor 724. The bulk order processor 724 may enable the ordering backend 720 to perform mass processing of orders. For example, the ordering backend 720 may receive an extremely large number of orders within a given time frame from the smart appliances 710, mobile application 712, web application 714, text or SMS application 716, the voice interface 718, or the call center workstations 722. Processing such an amount of orders may include determining, for each order, one or more local fulfillment center workstations out of thousands of potential local fulfillment center workstations 730 to receive the order.

The ordering backend 720 may also include a bulk order router 726. The bulk order router 726 may enable the ordering backend 720 to perform mass management of logistics, including delivery scheduling and collection scheduling of received orders. For example, the ordering backend may receive an extremely large number of orders within a given time frame from the smart appliances 710, mobile application 712, web application 714, text or SMS application 716, the voice interface 718, or the call center workstations 722. Managing the delivery scheduling or collection scheduling of such an amount of orders may include determining an order preparation schedule for each local fulfillment center workstation.

The ordering backend 720 performs a variety of tasks relating to processing or routing bulk orders, including sorting, assigning, routing, queuing, distributing and scheduling, to name a few. The study, optimization and execution of these tasks requires the uses of techniques and results from well-developed, active areas of scientific research, such as operational research, combinatorial optimization, graph theory (in particular network theory), queuing theory, and transport theory. Executing or providing optimal solutions to such tasks are proven to be complex and mathematically hard, particularly when considering large-scale systems. For example, e-commerce giant Amazon reported that they received, processed and delivered orders for 426 items per second in the run up to Christmas in 2013, see for example http://articles.latimes.com/2013/dec/26/business/la-fi-tn-amazon-sold-426-items-per-second-cyber-monday-20131226.

Since scaling is an extremely important factor, particularly in the context of e-commerce, tasks relating to processing or routing bulk orders quickly become extremely difficult, if not impossible, to solve and require powerful computers implementing complex algorithms and elegant mathematical programming techniques, as well as robust hardware architectures that can be parallelized. In some cases, it has even been shown that many tasks relating to the processing or routing of bulk orders are computationally intractable. In fact, the theory of computational complexity has introduced a concept of NP-hardness to classify such computationally intractable tasks.

For example, consider the intensely studied Traveling Salesman Problem (TSP), an NP-hard problem in combinatorial optimization. In its purest formulation, the TSP may be described as follows: given a list of cities and the distances between each pair of cities, what is the shortest route that visits each city exactly once, and returns to the original city. The TSP may also be modeled and described as a graph problem, wherein the cities are the graph's vertices and the distances between each pair of cities are the lengths of the graph's edges, or formulated as an integer linear program. The TSP has several applications in operational research, including planning and logistics, wherein the concept of a city may represent customers or orders, and the concept of a distance may represent travelling times or incurred costs. In some implementations, additional constraints may be imposed on the TSP, such as limiting an amount of resources or limiting to certain time windows. Finding increasingly efficient solutions to the TSP and other such complex, subtle operational research problems is an active area of scientific research, as evidenced by a plethora of technical textbooks, journals and scientific articles. See, for example "In Pursuit of the Travelling Salesman: Mathematics at the Limits of Computation," William Cook, Princeton University Press, 2011, "Dynamic programming strategies and reduction techniques for the traveling salesman problem with time windows and precedence constraints," L. Bianco, A. Mingozzi, and S. Ricciardelli, Operations Research, 45 (1997) 365-377 and "Scheduling vehicles from a central depot to a number of delivery points," G. Clarke and J. Wright, Operations Research 12 (1964) 568-581.

Another well-studied, fundamental combinatorial optimization problem in the field of operational research and optimization is the Assignment Problem (AP). In its most general form, the AP may be described as follows: given a number of agents, a number of tasks and a set of incurring costs for each potential agent-task assignment, perform all tasks by assigning one agent to each task, and one task to each agent, such that the total costs incurred is minimized. The AP also has several applications in areas such as planning and logistics. For example, the ordering backend 720 may interpret the task of processing received orders as an assignment problem, wherein a local fulfillment center workstation can be assigned to deliver an order, incurring some cost. The bulk order processor 724, for example, may require that all orders are delivered by assigning one local fulfillment center to each order, and one order to each local fulfillment center, in such a way that the total cost of the assignment is minimized. It has been shown that such an assignment problem can be expressed mathematically as a standard linear program, see, for example "Algorithms for the Assignment and Transportation Problems," James Munkres, Journal of the Society for Industrial and Applied Mathematics Vol. 5, No. 1 (March, 1957), pp. 32-38.

Linear programming has been shown to be an extremely powerful, essential optimization technique widely applied in various fields of study such as business studies and economics, as well as industrial areas such as engineering, transportation and manufacturing. The sophisticated mathematical programming techniques used in linear programming have proven essential to the modeling of diverse types of problems in routing, scheduling and assignment, and in turn have led to the creation of powerful computer systems that enable businesses to reduce costs, improve profitability, use resources effectively, reduce risks and provide untold benefits in many other key dimensions. Mathematically, linear programming is a technique for the optimization of a linear objective function, subject to linear equality and linear inequality constraints. While this requirement may seem overly restrictive, many real-world business problems can be formulated in this manner. Today, commercial linear-programming codes are able to solve linear programs with millions of constraints. For example, the commercial, high-performance mathematical programming solver IBM ILOG CPLEX of IBM is able to solve linear programs with the number of megabytes required for computation approximately equal to the number of constraints divided by 1000, see http://www-01.ibm.com/support/docview.wss?uid=swg21399933.

When dealing with large-scale systems, system components, such as the ordering backend 720, may employ techniques and results from Queuing Theory—the mathematical study of waiting lines, or queues—in order to model incoming customers or orders and subsequently make business decisions relating to order fulfillment, resource requirements for providing a certain service, expected waiting time in a queue, average time in a queue, expected queue length, expected number of customers in a queue at a given time, and the probability of a system to be in a certain state, such as empty or full. For example, it has been shown that most queues in restaurant operations can be described by an M/M/1 queue, where arrivals are determined by a Poisson process with heavy periods around lunch and dinner time, and service times have an exponential distribution. In a complex system of multiple M/M/1 queues, or a queue network, deep and sophisticated mathematical techniques such as stochastic calculus may be employed to model or approximate the queuing process. For example, in some implementations a heavy traffic approximation may be used to approximate a queuing process by a reflected Brownian motion, Ornstein-Uhlenbeck process or more general diffusion process. Since queues are basic components to both external and internal business processes, including scheduling and inventory management, understanding the nature of queues and learning how to manage them is one of the most important areas in operational research and management. See, for example, "A Methodology and Implementation for Analytic Modeling in Electronic Commerce Applications," H. Edwards, M. Bauer, H. Lutfiyya, Y. Chan, M. Shields and P. Woo, Electronic Commerce Technologies, Lecture notes in computer science, Volume 2040, 2001, pp 148-157 and "Stochastic Models in Queuing Theory", J. Medhi, Elsevier Academic Press, 2002.

The local fulfillment center workstations 730 may receive orders from the ordering backend 720. For example, a particular local fulfillment center workstation may receive an order for pizza from the ordering backend 720. The local fulfillment center workstations may be located on the premises of the local fulfillment center and used by agents of the local fulfillment center. For example, a local fulfillment center workstation of a pizza provider may be located in a kitchen of the pizza provider and used by bakers to determine what pizzas to bake and when to bake the pizzas. In another example, local fulfillment center workstations of a pizza provider may be located in delivery vehicles of the pizza provider and used by pizza deliverers to determine where to deliver each pizza or a delivery route for the pizzas. The delivery route may be dynamically planned based on types of orders and locations to which the orders will be delivered. In yet another example, a local fulfillment center workstation may be used by a cashier of a pizza provider and used by the cashier to place additional orders for customers within the restaurant or determine whether a customer is the correct customer to receive a pizza that is ordered for pickup at the restaurant. In some implementations, the local fulfillment center workstations 730 may be the fulfillment center workstations 130, 140 of FIG. 1.

The local fulfillment center workstations 730 may provide information to agents of the local fulfillment center to fulfill orders. For example, a particular local fulfillment center workstation of a pizza provider may display an order number, a type of pizza ordered, a customer name for the order, a place of delivery for the order, and a time of delivery for the order. The local fulfillment center workstations 730 may obtain the information to provide agents of the local fulfillment center from the orders received from the ordering backend 720. For example, the orders received from the ordering backend 720 may include data that indicates an order number, a type of pizza ordered, a customer name for the order, a place of delivery for the order, and a time of delivery for the order. In some implementations, the local fulfillment center workstations 730 may prioritize the fulfillment of orders. For example, the local fulfillment center workstations 730 may prioritize the fulfillment of orders based on when the orders are to be provided to the users.

The local fulfillment center workstations 730 may include a local, voice-based order taking component 132. For example, the local fulfillment center workstations 730 may include a telephone-based system with which an employee of the local fulfillment center may speak to the customer. The local, voice-based order taking component 132 may enable customers to place orders directly with the local fulfillment center. For example, the same local fulfillment center workstations 730 that receive orders from the ordering backend 720 may also be used to generate orders based on input from customer service agents using the local fulfillment center workstations 730. In some implementations, the local, voice-based order taking component 132 may be automated and use speech recognition to generate orders for users.

The local fulfillment center workstations 730 may additionally or alternatively communicate with a supply chain or finance or enterprise component of a third party. For example, a local fulfillment center workstation may place an order for more flour with a supply chain component of a third party that sells flour for pizza. In another example, a local fulfillment center workstation may communicate with a finance component to place payment charges for orders.

The local fulfillment center workstations 730 may automatically determine to communicate with the supply chain or finance or enterprise component. For example, the local fulfillment center workstations 730 may automatically determine that the amount of flour in the inventory of the local fulfillment center is below a flour threshold, and in response, place an order for flour to the supply chain component of a pizza flour provider.

Figure 8:
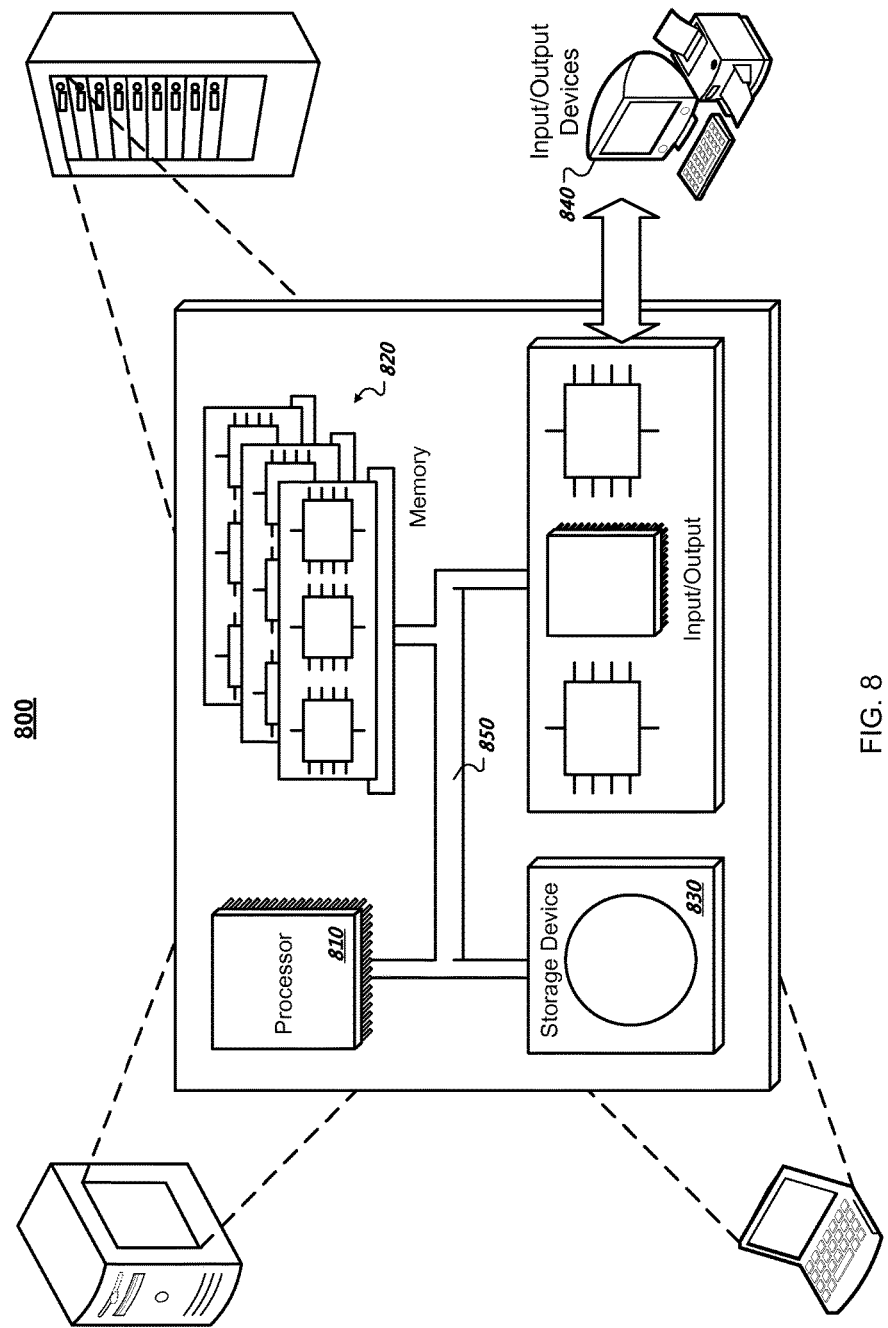
FIG. 8 illustrates a schematic diagram of an exemplary generic computer system.

FIG. 8 illustrates a schematic diagram of an exemplary generic computer system. The system 800 can be used for the operations described in association with the processes 500 and 600 according to some implementations. The system 800 may be included in the system 100.

The system 800 includes a processor 810, a memory 820, a storage device 830, and an input/output device 840. Each of the components 810, 820, 830, and 820 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them. In some cases, the one or more programmable computers may be connected by a network to form a distributed computing environment (e.g., a cloud).

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer implemented method, comprising:
    tracking, over time and by bulk order processing server of an order processing system that includes (i) the bulk order processing server, (ii) local fulfillment center workstations that are each associated with a different third party fulfillment center, and (iii) multiple user devices, performance of the fulfillment center in fulfilling orders for items at the fulfillment center based on data collected at the local fulfillment center workstations, and user responses to alternate suggestions based on data collected at the multiple user devices;
    based on the tracking by the bulk order processing server, storing, in an electronic database accessible to the bulk order processing server of the order processing system, historical preparation information that describes historical performance of the fulfillment center in fulfilling orders for items at the fulfillment center based on the data collected at the local fulfillment center workstations;
    based on the tracking by the bulk order processing server, storing, in the electronic database accessible to the bulk order processing server of the order processing system, historical user information that indicates a likelihood that a user indicate acceptance of an alternate suggestion at one of the user devices;
    receiving, over a network, by the bulk order processing server, and from one of the user associated with the user and the order processing system, an order for an item to be fulfilled by a particular local fulfillment center for a fulfillment time, where the order indicates the item and the particular fulfillment center fulfills the order by enabling an employee at the fulfillment center to prepare the item for the user, wherein the particular user device is a mobile computing device and the order is entered through a graphical user interface of a web application presented on the mobile computing device;
    in response to receiving the order from the user device:
        obtaining, from the database accessible to the bulk order processing server and based at least on the indication in the order of the fulfillment center, a portion of the stored historical preparation information for the fulfillment center that describes historical performance of the fulfillment center that is relevant to fulfillment of the item by the fulfillment time;
        obtaining, based at least on the indication in the order of the fulfillment center, current order information that describes other orders to be fulfilled at the fulfillment center; and
        determining, by the bulk order processing server, to provide an alternate suggestion for the user device to provide to the user through the graphical user interface of the web application based at least on a portion of the stored historical preparation information and the current order information;
    in response to determining to provide the alternate suggestion for the user device to provide to the user through the graphical user interface of the web application, identifying, by the bulk order processing server, at least one of an alternate item, an alternate fulfillment center, or an alternate time to include in the alternate suggestion based on the stored historical user information that indicates a likelihood that the user will indicate acceptance of an alternate suggestion at one of the user devices and further based at least on historical performance of the alternate fulfillment center, current orders for the alternate fulfillment center, historical performance for the alternate item, current orders for the alternate item, or current orders for the alternate time;
    generating, by the bulk order processing server, the alternate suggestion based on the identification of at least one of the alternate item, the alternate fulfillment center, or the alternate time to include in the alternate suggestion; and
    providing, over the network and by the bulk order processing server, instructions that trigger the graphical user interface of the web application on the user device to (i) provide the alternate suggestion to the user without the user providing further input after the user enters the order through the graphical user interface of the web application and (ii) disable entering, in the graphical user interface of the web application, a request for the item from the fulfillment center.

2. The method of claim 1, wherein determining, to provide an alternate suggestion for the user device to provide to the user through the graphical user interface of the web application based at least on a portion of the stored historical preparation information and the current order information comprises:
  determining that the order cannot be fulfilled by the fulfillment center for the fulfillment time.

3. The method of claim 1, wherein determining, to provide an alternate suggestion for the user device to provide to the user through the graphical user interface of the web application based at least on a portion of the stored historical preparation information and the current order information comprises:
  determining that the order can be fulfilled by the fulfillment center for the fulfillment time but another order is likely to be placed for the item for the fulfillment time.

4. The method of claim 1, wherein determining, to provide an alternate suggestion for the user device to provide to the user through the graphical user interface of the web application based at least on a portion of the stored historical preparation information and the current order information comprises:
  determining that the alternate suggestion is likely to result in a better business value for an entity providing the server.

5. The method of claim 1, identifying at least one of an alternate item, an alternate fulfillment center, or an alternate time to include in the alternate suggestion based on the stored historical user information that indicates a likelihood that the user will accept the alternate suggestion comprises:
  determining that the alternate suggestion can be fulfilled.

6. The method of claim 1, wherein identifying at least one of an alternate item, an alternate fulfillment center, or an alternate time to include in the alternate suggestion based on the stored historical user information that indicates a likelihood that the user will accept the alternate suggestion comprises:
  determining that the user is likely to be interested in the alternate item based on the stored historical user information that indicates a likelihood that the user will accept the alternate suggestion; and
  in response to determining that the user is likely to be interested in the alternate item based on the stored historical user information that indicates a likelihood that the user will accept the alternate suggestion, identifying the alternate item.

7. The method of claim 1, wherein identifying at least one of an alternate item, an alternate fulfillment center, or an alternate time to include in the alternate suggestion based on the stored historical user information that indicates a likelihood that the user will accept the alternate suggestion comprises:
  determining a likely route for the user based at least on the stored historical user information that indicates a likelihood that the user will accept the alternate suggestion;
  determining that the alternate fulfillment center is accessible along the likely route; and
  in response to determining that the alternate fulfillment center is accessible along the likely route, identifying the alternate fulfillment center.

8. The method of claim 1, wherein identifying at least one of an alternate item, an alternate fulfillment center, or an alternate time to include in the alternate suggestion based on the stored historical user information that indicates a likelihood that the user will accept the alternate suggestion comprises:
  determining an earliest time after the fulfillment time that the order can be fulfilled;
  determining whether the earliest time satisfies a time threshold with the fulfillment time; and
  in response to determining that the earliest time satisfies the time threshold with the fulfillment time, identifying the earliest time as the alternate time.

9. The method of claim 1, wherein generating the alternate suggestion based on the identification of at least one of the alternate item, the alternate fulfillment center, or the alternate time to include in the alternate suggestion comprises:
  determining a discount to include in the alternate suggestion; and
  including the discount in the alternate suggestion.

10. The method of claim 1, comprising:
  reserving an order for the alternate suggestion for a predetermined time before receiving a response from the user device to the alternate suggestion.

11. The method of claim 1, wherein generating the alternate suggestion based on the identification of at least one of the alternate item, the alternate fulfillment center, or the alternate time to include in the alternate suggestion comprises:
  generating, for each of multiple candidate alternate suggestions, outcomes scores that each indicate an estimated value of the candidate alternate suggestion; and
  selecting a predetermined number of the candidate alternate suggestions based at least on the outcome scores.

12. A system comprising:
  one or more computers and one or more storage devices storing instructions that are operable, when executed by the one or more computers, to cause the one or more computers to perform operations comprising:
    tracking, over time and by bulk order processing server of an order processing system that includes (i) the bulk order processing server, (ii) local fulfillment center workstations that are each associated with a different third party fulfillment center, and (iii) multiple user devices, performance of the fulfillment center in fulfilling orders for items at the fulfillment center based on data collected at the local fulfillment center workstations, and user responses to alternate suggestions based on data collected at the multiple user devices;
    based on the tracking by the bulk order processing server, storing, in an electronic database accessible to the bulk order processing server of the order processing system, historical preparation information that describes historical performance of the fulfillment center in fulfilling orders for items at the fulfillment center based on the data collected at the local fulfillment center workstations;
    based on the tracking by the bulk order processing server, storing, in the electronic database accessible to the bulk order processing server of the order processing system, historical user information that indicates a likelihood that a user indicate acceptance of an alternate suggestion at one of the user devices;
    receiving, over a network, by the bulk order processing server, and from one of the user associated with the user and the order processing system, an order for an item to be fulfilled by a particular local fulfillment center for a fulfillment time, where the order indicates the item and the particular fulfillment center fulfills the order by enabling an employee at the fulfillment center to prepare the item for the user, wherein the particular user device is a mobile computing device and the order is entered through a graphical user interface of a web application presented on the mobile computing device;

in response to receiving the order from the user device:
obtaining, from the database accessible to the bulk order processing server and based at least on the indication in the order of the fulfillment center, a portion of the stored historical preparation information for the fulfillment center that describes historical performance of the fulfillment center that is relevant to fulfillment of the item by the fulfillment time;

obtaining, based at least on the indication in the order of the fulfillment center, current order information that describes other orders to be fulfilled at the fulfillment center; and determining, by the bulk order processing server, to provide an alternate suggestion for the user device to provide to the user through the graphical user interface of the web application based at least on a portion of the stored historical preparation information and the current order information;

in response to determining to provide the alternate suggestion for the user device to provide to the user through the graphical user interface of the web application, identifying, by the bulk order processing server, at least one of an alternate item, an alternate fulfillment center, or an alternate time to include in the alternate suggestion based on the stored historical user information that indicates a likelihood that the user will indicate acceptance of an alternate suggestion at one of the user devices and further based at least on historical performance of the alternate fulfillment center, current orders for the alternate fulfillment center, historical performance for the alternate item, current orders for the alternate item, or current orders for the alternate time;

generating, by the bulk order processing server, the alternate suggestion based on the identification of at least one of the alternate item, the alternate fulfillment center, or the alternate time to include in the alternate suggestion; and providing, over the network and by the bulk order processing server, instructions that trigger the graphical user interface of the web application on the user device to (i) provide the alternate suggestion to the user without the user providing further input after the user enters the order through the graphical user interface of the web application and (ii) disable entering, in the graphical user interface of the web application, a request for the item from the fulfillment center.

13. The system of claim 12, wherein determining, to provide an alternate suggestion for the user device to provide to the user through the graphical user interface of the web application based at least on a portion of the stored historical preparation information and the current order information comprises:
determining that the order cannot be fulfilled by the fulfillment center for the fulfillment time.

14. The system of claim 12, wherein determining, to provide an alternate suggestion for the user device to provide to the user through the graphical user interface of the web application based at least on a portion of the stored historical preparation information and the current order information comprises:
determining that the order can be fulfilled by the fulfillment center for the fulfillment time but another order is likely to be placed for the item for the fulfillment time.

15. The system of claim 12, wherein determining, to provide an alternate suggestion for the user device to provide to the user through the graphical user interface of the web application based at least on a portion of the stored historical preparation information and the current order information comprises:
determining that the alternate suggestion is likely to result in a better business value for an entity providing the server.

16. The system of claim 12, identifying at least one of an alternate item, an alternate fulfillment center, or an alternate time to include in the alternate suggestion based on the stored historical user information that indicates a likelihood that the user will accept the alternate suggestion comprises:
determining that the alternate suggestion can be fulfilled.

17. The system of claim 12, wherein identifying at least one of an alternate item, an alternate fulfillment center, or an alternate time to include in the alternate suggestion based on the stored historical user information that indicates a likelihood that the user will accept the alternate suggestion comprises:
determining that the user is likely to be interested in the alternate item based on the stored historical user information that indicates a likelihood that the user will accept the alternate suggestion; and
in response to determining that the user is likely to be interested in the alternate item based on the stored historical user information that indicates a likelihood that the user will accept the alternate suggestion, identifying the alternate item.

18. The system of claim 12, wherein identifying at least one of an alternate item, an alternate fulfillment center, or an alternate time to include in the alternate suggestion based on the stored historical user information that indicates a likelihood that the user will accept the alternate suggestion comprises:
determining a likely route for the user based at least on the stored historical user information that indicates a likelihood that the user will accept the alternate suggestion;
determining that the alternate fulfillment center is accessible along the likely route; and
in response to determining that the alternate fulfillment center is accessible along the likely route, identifying the alternate fulfillment center.

19. A non-transitory computer-readable medium storing software comprising instructions executable by one or more computers which, upon such execution, cause the one or more computers to perform operations comprising:
tracking, over time and by bulk order processing server of an order processing system that includes (i) the bulk order processing server, (ii) local fulfillment center workstations that are each associated with a different third party fulfillment center, and (iii) multiple user devices, performance of the fulfillment center in fulfilling orders for items at the fulfillment center based on data collected at the local fulfillment center workstations, and user responses to alternate suggestions based on data collected at the multiple user devices;
based on the tracking by the bulk order processing server, storing, in an electronic database accessible to the bulk order processing server of the order processing system, historical preparation information that describes historical performance of the fulfillment center in fulfilling orders for items at the fulfillment center based on the data collected at the local fulfillment center workstations;

based on the tracking by the bulk order processing server, storing, in the electronic database accessible to the bulk order processing server of the order processing system, historical user information that indicates a likelihood that a user indicate acceptance of an alternate suggestion at one of the user devices;

receiving, over a network, by the bulk order processing server, and from one of the user associated with the user and the order processing system, an order for an item to be fulfilled by a particular local fulfillment center for a fulfillment time, where the order indicates the item and the particular fulfillment center fulfills the order by enabling an employee at the fulfillment center to prepare the item for the user, wherein the particular user device is a mobile computing device and the order is entered through a graphical user interface of a web application presented on the mobile computing device;

in response to receiving the order from the user device:
    obtaining, from the database accessible to the bulk order processing server and based at least on the indication in the order of the fulfillment center, a portion of the stored historical preparation information for the fulfillment center that describes historical performance of the fulfillment center that is relevant to fulfillment of the item by the fulfillment time;
    obtaining, based at least on the indication in the order of the fulfillment center, current order information that describes other orders to be fulfilled at the fulfillment center; and
    determining, by the bulk order processing server, to provide an alternate suggestion for the user device to provide to the user through the graphical user interface of the web application based at least on a portion of the stored historical preparation information and the current order information;

in response to determining to provide the alternate suggestion for the user device to provide to the user through the graphical user interface of the web application, identifying, by the bulk order processing server, at least one of an alternate item, an alternate fulfillment center, or an alternate time to include in the alternate suggestion based on the stored historical user information that indicates a likelihood that the user will indicate acceptance of an alternate suggestion at one of the user devices and further based at least on historical performance of the alternate fulfillment center, current orders for the alternate fulfillment center, historical performance for the alternate item, current orders for the alternate item, or current orders for the alternate time;

generating, by the bulk order processing server, the alternate suggestion based on the identification of at least one of the alternate item, the alternate fulfillment center, or the alternate time to include in the alternate suggestion; and providing, over the network and by the bulk order processing server, instructions that trigger the graphical user interface of the web application on the user device to (i) provide the alternate suggestion to the user without the user providing further input after the user enters the order through the graphical user interface of the web application and (ii) disable entering, in the graphical user interface of the web application, a request for the item from the fulfillment center.

\* \* \* \* \*